(12) United States Patent
Forstall et al.

(10) Patent No.: US 8,774,825 B2
(45) Date of Patent: Jul. 8, 2014

(54) INTEGRATION OF MAP SERVICES WITH USER APPLICATIONS IN A MOBILE DEVICE

(75) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 780 days.

(21) Appl. No.: 12/135,073

(22) Filed: Jun. 6, 2008

(65) Prior Publication Data

US 2009/0005072 A1 Jan. 1, 2009

Related U.S. Application Data

(60) Provisional application No. 60/946,915, filed on Jun. 28, 2007.

(51) Int. Cl.
 *H04W 24/00* (2009.01)
 *G06F 3/14* (2006.01)

(52) U.S. Cl.
 USPC ............... 455/456.1; 455/456.2; 455/456.3; 715/864

(58) Field of Classification Search
 USPC ............... 455/456.1–456.3; 715/864
 See application file for complete search history.

(56) References Cited

U.S. PATENT DOCUMENTS

| | | | |
|---|---|---|---|
| 4,644,351 A | 2/1987 | Zabarsky et al. | |
| 4,903,212 A | 2/1990 | Yokouchi et al. | |
| 4,907,159 A | 3/1990 | Mauge et al. | |
| 4,999,783 A | 3/1991 | Tenmoku et al. | |
| 5,031,104 A | 7/1991 | Ikeda et al. | |
| 5,046,011 A | 9/1991 | Kakihara et al. | |
| 5,067,081 A | 11/1991 | Person | |
| 5,126,941 A | 6/1992 | Gurmu et al. | |
| 5,164,904 A | 11/1992 | Sumner | |
| 5,170,165 A | 12/1992 | Iihoshi et al. | |
| 5,173,691 A | 12/1992 | Sumner | |
| 5,182,555 A | 1/1993 | Sumner | |
| 5,187,810 A | 2/1993 | Toneyama et al. | |

(Continued)

FOREIGN PATENT DOCUMENTS

BR 9904979 12/2000
CA 2163215 5/1994

(Continued)

OTHER PUBLICATIONS

Microsoft Outlook 2003 User's Guide. http://opan.admin.ufl.edu/user_guides/outlook2003.htm. Aug. 2004.*

(Continued)

*Primary Examiner* — Nathan Mitchell
(74) *Attorney, Agent, or Firm* — Fish & Richardson P.C.

(57) ABSTRACT

A method includes receiving an electronic message at a mobile device; displaying the electronic message in an electronic message user interface, the electronic message including sender information; determining a contact entry of an address book application associated with the sender information of the electronic message, the contact entry including physical address information; determining a geographic location of the mobile device; and displaying the contact entry on an address book application user interface, the displayed contact entry including proximity information indicating a distance from the device to the physical address of the contact entry.

14 Claims, 12 Drawing Sheets

(56) References Cited

U.S. PATENT DOCUMENTS

| | | |
|---|---|---|
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,463,725 A | 10/1995 | Henckel |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw |
| 5,630,206 A | 5/1997 | Urban et al. |
| 5,636,245 A | 6/1997 | Ernst |
| 5,642,303 A | 6/1997 | Small |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,270 A | 11/1997 | Kelley et al. |
| 5,689,431 A | 11/1997 | Rudow et al. |
| 5,708,478 A | 1/1998 | Tognazzini |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,774,824 A | 6/1998 | Streit et al. |
| 5,774,829 A | 6/1998 | Cisneros et al. |
| 5,793,630 A | 8/1998 | Theimer |
| 5,796,365 A | 8/1998 | Lewis |
| 5,796,613 A | 8/1998 | Kato et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins |
| 6,092,076 A | 7/2000 | McDonough et al. |
| 6,094,607 A | 7/2000 | Diesel |
| 6,101,443 A | 8/2000 | Kato |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |

(56) References Cited

U.S. PATENT DOCUMENTS

| | | |
|---|---|---|
| 6,151,498 A | 11/2000 | Roel-Ng et al. |
| 6,154,152 A | 11/2000 | Ito |
| 6,157,381 A | 12/2000 | Bates et al. |
| 6,157,841 A | 12/2000 | Bolduc et al. |
| 6,163,749 A | 12/2000 | McDonough et al. |
| 6,166,627 A | 12/2000 | Reeley |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,185,427 B1 | 2/2001 | Krasner et al. |
| 6,188,959 B1 | 2/2001 | Schupfner |
| 6,195,557 B1 | 2/2001 | Havinis et al. |
| 6,195,609 B1 | 2/2001 | Pilley et al. |
| 6,199,014 B1 | 3/2001 | Walker |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,298,306 B1 | 10/2001 | Suarez et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,332,127 B1 | 12/2001 | Bandera et al. |
| 6,339,437 B1 | 1/2002 | Nielsen |
| 6,339,746 B1 | 1/2002 | Sugiyama et al. |
| 6,343,317 B1 | 1/2002 | Glorikian |
| 6,345,288 B1 | 2/2002 | Reed et al. |
| 6,351,235 B1 | 2/2002 | Stilp |
| 6,353,398 B1 | 3/2002 | Amin et al. |
| 6,353,743 B1 | 3/2002 | Karmel |
| 6,353,837 B1 | 3/2002 | Blumenau |
| 6,356,761 B1 | 3/2002 | Huttunen |
| 6,356,763 B1 | 3/2002 | Kangas et al. |
| 6,356,836 B1 | 3/2002 | Adolph |
| 6,356,838 B1 | 3/2002 | Paul |
| 6,370,629 B1 | 4/2002 | Hastings et al. |
| 6,377,886 B1 | 4/2002 | Gotou |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,401,027 B1 | 6/2002 | Xu et al. |
| 6,401,032 B1 | 6/2002 | Jamison |
| 6,405,034 B1 | 6/2002 | Tijerino |
| 6,405,123 B1 | 6/2002 | Rennard et al. |
| 6,411,899 B2 | 6/2002 | Dussell et al. |
| 6,414,635 B1 | 7/2002 | Stewart et al. |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |
| 6,449,485 B1 | 9/2002 | Anzil |
| 6,452,498 B2 | 9/2002 | Stewart |
| 6,456,234 B1 | 9/2002 | Johnson |
| 6,456,956 B1 | 9/2002 | Xiong |
| 6,459,782 B1 * | 10/2002 | Bedrosian et al. ....... 379/201.08 |
| 6,463,289 B1 | 10/2002 | Havinis et al. |
| 6,477,581 B1 | 11/2002 | Carpenter |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,501,421 B1 | 12/2002 | Dutta et al. |
| 6,505,046 B1 | 1/2003 | Baker |
| 6,505,048 B1 | 1/2003 | Moles et al. |
| 6,505,123 B1 | 1/2003 | Root et al. |
| 6,507,802 B1 | 1/2003 | Payton et al. |
| 6,516,197 B2 | 2/2003 | Havinis et al. |
| 6,519,463 B2 | 2/2003 | Tendler |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |
| 6,542,819 B1 | 4/2003 | Kovacs et al. |
| 6,545,638 B2 | 4/2003 | Sladen |
| 6,546,336 B1 | 4/2003 | Matsuoka et al. |
| 6,546,360 B1 | 4/2003 | Gilbert et al. |
| 6,552,682 B1 | 4/2003 | Fan |
| 6,563,430 B1 | 5/2003 | Kemink et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,574,550 B2 | 6/2003 | Hashida |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,597,305 B2 | 7/2003 | Szeto et al. |
| 6,611,687 B1 | 8/2003 | Clark et al. |
| 6,611,788 B1 | 8/2003 | Hussa |
| 6,615,131 B1 | 9/2003 | Rennard et al. |
| 6,615,213 B1 | 9/2003 | Johnson |
| 6,643,587 B2 | 11/2003 | Brodie et al. |
| 6,647,257 B2 | 11/2003 | Owensby |
| 6,650,902 B1 | 11/2003 | Richton |
| 6,650,997 B2 | 11/2003 | Funk |
| 6,662,016 B1 | 12/2003 | Buckham et al. |
| 6,667,963 B1 | 12/2003 | Rantalainen et al. |
| 6,671,377 B1 | 12/2003 | Havinis et al. |
| 6,674,849 B1 * | 1/2004 | Froeberg ................. 379/201.06 |
| 6,677,894 B1 | 1/2004 | Sheynblat |
| 6,678,516 B2 | 1/2004 | Nordman et al. |
| 6,679,932 B2 | 1/2004 | Birler et al. |
| 6,680,694 B1 | 1/2004 | Knockeart et al. |
| 6,681,120 B1 | 1/2004 | Kim |
| 6,683,538 B1 | 1/2004 | Wilkes, Jr. |
| 6,697,018 B2 | 2/2004 | Stewart |
| 6,697,734 B1 | 2/2004 | Suomela |
| 6,711,408 B1 | 3/2004 | Raith |
| 6,711,474 B1 | 3/2004 | Treyz et al. |
| 6,714,791 B2 | 3/2004 | Friedman |
| 6,718,344 B2 | 4/2004 | Hirono |
| 6,721,572 B1 | 4/2004 | Smith et al. |
| 6,731,236 B1 | 5/2004 | Hager et al. |
| 6,731,238 B2 | 5/2004 | Johnson |
| 6,732,047 B1 | 5/2004 | de Silva |
| 6,738,808 B1 | 5/2004 | Zellner et al. |

(56) References Cited

U.S. PATENT DOCUMENTS

| | | | |
|---|---|---|---|
| 6,741,188 B1 | 5/2004 | Miller et al. | |
| 6,741,926 B1 | 5/2004 | Zhao et al. | |
| 6,748,226 B1 | 6/2004 | Wortham | |
| 6,748,318 B1 | 6/2004 | Jones | |
| 6,750,883 B1 | 6/2004 | Parupudi et al. | |
| 6,759,960 B2 | 7/2004 | Stewart | |
| 6,762,772 B1 | 7/2004 | Imamura et al. | |
| 6,766,174 B1 * | 7/2004 | Kenyon | 455/457 |
| 6,766,245 B2 | 7/2004 | Padmanabhan | |
| 6,781,575 B1 | 8/2004 | Hawkins et al. | |
| 6,782,278 B2 | 8/2004 | Chen et al. | |
| 6,789,012 B1 | 9/2004 | Childs et al. | |
| 6,795,686 B2 | 9/2004 | Master et al. | |
| 6,801,855 B1 | 10/2004 | Walters et al. | |
| 6,810,323 B1 | 10/2004 | Bullock et al. | |
| 6,813,501 B2 | 11/2004 | Kinnunen et al. | |
| 6,813,503 B1 | 11/2004 | Zillikens et al. | |
| 6,813,582 B2 | 11/2004 | Levi et al. | |
| 6,816,782 B1 | 11/2004 | Walters et al. | |
| 6,819,919 B1 | 11/2004 | Tanaka | |
| 6,823,188 B1 | 11/2004 | Stern | |
| 6,834,195 B2 | 12/2004 | Brandenberg et al. | |
| 6,845,318 B1 | 1/2005 | Moore et al. | |
| 6,847,891 B2 | 1/2005 | Pietras et al. | |
| 6,847,969 B1 | 1/2005 | Mathai et al. | |
| 6,853,911 B1 | 2/2005 | Sakarya | |
| 6,853,917 B2 | 2/2005 | Miwa | |
| 6,859,149 B1 | 2/2005 | Ohta | |
| 6,865,483 B1 | 3/2005 | Cook, III et al. | |
| 6,868,074 B1 | 3/2005 | Hanson | |
| 6,871,144 B1 | 3/2005 | Lee | |
| 6,882,313 B1 | 4/2005 | Fan et al. | |
| 6,888,536 B2 | 5/2005 | Westerman et al. | |
| 6,909,902 B1 | 6/2005 | Sawada et al. | |
| 6,912,398 B1 | 6/2005 | Domnitz | |
| 6,914,626 B2 | 7/2005 | Squibbs | |
| 6,915,208 B2 | 7/2005 | Garin et al. | |
| 6,931,322 B2 | 8/2005 | Jung et al. | |
| 6,933,841 B2 | 8/2005 | Muramatsu et al. | |
| 6,944,447 B2 | 9/2005 | Portman et al. | |
| 6,948,656 B2 | 9/2005 | Williams | |
| 6,950,746 B2 | 9/2005 | Yano et al. | |
| 6,952,181 B2 | 10/2005 | Karr et al. | |
| 6,954,646 B2 | 10/2005 | Church | |
| 6,954,735 B1 | 10/2005 | Djupsjobacka et al. | |
| 6,957,072 B2 | 10/2005 | Kangras et al. | |
| 6,975,959 B2 | 12/2005 | Dietrich et al. | |
| 6,980,909 B2 | 12/2005 | Root et al. | |
| 6,990,495 B1 * | 1/2006 | Grason et al. | 1/1 |
| 6,999,779 B1 | 2/2006 | Hashimoto | |
| 7,003,289 B1 | 2/2006 | Kolls | |
| 7,009,556 B2 | 3/2006 | Stewart | |
| 7,031,725 B2 | 4/2006 | Rorabaugh | |
| 7,044,372 B2 | 5/2006 | Okuda et al. | |
| 7,058,594 B2 | 6/2006 | Stewart | |
| 7,069,319 B2 | 6/2006 | Zellner et al. | |
| 7,076,255 B2 | 7/2006 | Parupudi et al. | |
| 7,082,365 B2 | 7/2006 | Sheha et al. | |
| 7,089,264 B1 | 8/2006 | Guido et al. | |
| 7,096,029 B1 | 8/2006 | Parupudi et al. | |
| 7,096,030 B2 | 8/2006 | Huomo | |
| 7,103,470 B2 | 9/2006 | Mintz | |
| 7,117,015 B2 | 10/2006 | Scheinert et al. | |
| 7,120,469 B1 | 10/2006 | Urakawa | |
| 7,123,189 B2 | 10/2006 | Lalik et al. | |
| 7,123,926 B2 | 10/2006 | Himmelstein | |
| 7,146,298 B2 | 12/2006 | Motamedi et al. | |
| 7,149,503 B2 | 12/2006 | Aarnio et al. | |
| 7,151,921 B2 | 12/2006 | Otsuka | |
| 7,165,725 B2 | 1/2007 | Casey | |
| 7,171,190 B2 | 1/2007 | Ye et al. | |
| 7,181,189 B2 | 2/2007 | Hotta et al. | |
| 7,187,997 B2 | 3/2007 | Johnson | |
| 7,200,409 B1 | 4/2007 | Ichikawa et al. | |
| 7,200,566 B1 | 4/2007 | Moore et al. | |
| 7,213,048 B1 | 5/2007 | Parupudi et al. | |
| 7,215,967 B1 | 5/2007 | Kransmo et al. | |
| 7,236,883 B2 | 6/2007 | Garin et al. | |
| 7,254,481 B2 | 8/2007 | Yamada et al. | |
| 7,256,711 B2 | 8/2007 | Sheha et al. | |
| 7,257,392 B2 | 8/2007 | Tang et al. | |
| 7,260,378 B2 | 8/2007 | Holland et al. | |
| 7,266,376 B2 | 9/2007 | Nakagawa | |
| 7,269,601 B2 | 9/2007 | Kinno et al. | |
| 7,271,765 B2 | 9/2007 | Stilp et al. | |
| 7,272,403 B2 | 9/2007 | Creamer et al. | |
| 7,272,404 B2 | 9/2007 | Overy et al. | |
| 7,274,332 B1 | 9/2007 | Dupray | |
| 7,274,939 B2 | 9/2007 | Ruutu et al. | |
| 7,280,822 B2 | 10/2007 | Fraccaroli | |
| 7,286,933 B2 | 10/2007 | Cho | |
| 7,295,556 B2 | 11/2007 | Roese et al. | |
| 7,295,925 B2 | 11/2007 | Breed et al. | |
| 7,298,327 B2 | 11/2007 | Dupray et al. | |
| 7,299,008 B2 | 11/2007 | Gluck | |
| 7,310,516 B1 | 12/2007 | Vacanti | |
| 7,313,467 B2 | 12/2007 | Breed et al. | |
| 7,319,412 B1 | 1/2008 | Coppinger et al. | |
| 7,336,928 B2 | 2/2008 | Paalasmaa et al. | |
| 7,336,949 B2 | 2/2008 | Nasielski | |
| 7,339,496 B2 | 3/2008 | Endo et al. | |
| 7,343,564 B2 | 3/2008 | Othmer | |
| 7,349,706 B2 | 3/2008 | Kim et al. | |
| 7,353,034 B2 | 4/2008 | Haney | |
| 7,359,713 B1 | 4/2008 | Tiwari | |
| 7,370,283 B2 | 5/2008 | Othmer | |
| 7,373,246 B2 | 5/2008 | O'Clair | |
| 7,386,396 B2 | 6/2008 | Johnson | |
| 7,389,179 B2 | 6/2008 | Jin et al. | |
| 7,392,017 B2 | 6/2008 | Chu et al. | |
| 7,395,031 B1 | 7/2008 | Ritter | |
| 7,418,402 B2 | 8/2008 | McCrossin et al. | |
| 7,421,422 B1 | 9/2008 | Dempster et al. | |
| 7,421,486 B1 | 9/2008 | Parupudi et al. | |
| 7,426,437 B2 | 9/2008 | Breed et al. | |
| 7,427,021 B2 | 9/2008 | Kemper et al. | |
| 7,433,694 B2 | 10/2008 | Morgan et al. | |
| 7,440,842 B1 | 10/2008 | Vorona | |
| 7,441,203 B2 | 10/2008 | Othmer et al. | |
| 7,466,235 B1 | 12/2008 | Kolb et al. | |
| 7,483,944 B2 | 1/2009 | Parupudi et al. | |
| 7,486,201 B2 | 2/2009 | Kelly et al. | |
| 7,500,607 B2 | 3/2009 | Williams | |
| 7,512,487 B1 | 3/2009 | Golding et al. | |
| 7,522,927 B2 | 4/2009 | Fitch et al. | |
| 7,525,484 B2 | 4/2009 | Dupray et al. | |
| 7,536,388 B2 | 5/2009 | Jung et al. | |
| 7,545,281 B2 | 6/2009 | Richards et al. | |
| 7,558,696 B2 | 7/2009 | Vilppula et al. | |
| 7,565,132 B2 | 7/2009 | Ben Ayed | |
| 7,565,157 B1 | 7/2009 | Ortega et al. | |
| 7,574,222 B2 | 8/2009 | Sawada et al. | |
| 7,577,448 B2 | 8/2009 | Pande et al. | |
| 7,587,345 B2 | 9/2009 | Mann et al. | |
| 7,593,740 B2 | 9/2009 | Crowley et al. | |
| 7,593,991 B2 | 9/2009 | Friedman et al. | |
| 7,596,450 B2 | 9/2009 | Hong | |
| 7,599,795 B1 | 10/2009 | Blumberg et al. | |
| 7,603,233 B2 | 10/2009 | Tashiro | |
| 7,606,580 B2 | 10/2009 | Granito et al. | |
| 7,617,044 B2 | 11/2009 | Lee | |
| 7,620,404 B2 | 11/2009 | Chesnais et al. | |
| 7,623,848 B2 | 11/2009 | Rosenfelt et al. | |
| 7,624,358 B2 | 11/2009 | Kim et al. | |
| 7,647,174 B2 | 1/2010 | Kwon | |
| 7,680,591 B2 | 3/2010 | Nagaa et al. | |
| 7,689,916 B1 * | 3/2010 | Goel et al. | 715/711 |
| 7,710,290 B2 | 5/2010 | Johnson | |
| 7,711,478 B2 | 5/2010 | Gluck | |
| 7,714,778 B2 | 5/2010 | Dupray | |
| 7,729,691 B2 | 6/2010 | Newville | |
| 7,739,040 B2 | 6/2010 | Horvitz | |
| 7,743,074 B1 | 6/2010 | Parupudi et al. | |
| 7,756,639 B2 | 7/2010 | Colley et al. | |

(56) References Cited

U.S. PATENT DOCUMENTS

| | | |
|---|---|---|
| 7,768,395 B2 | 8/2010 | Gold |
| 7,783,421 B2 | 8/2010 | Arai et al. |
| 7,792,273 B2 | 9/2010 | Fano et al. |
| 7,811,203 B2 | 10/2010 | Unuma et al. |
| 7,822,547 B2 | 10/2010 | Lindroos |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,123 B2 | 2/2011 | Granito et al. |
| 7,933,612 B2 | 4/2011 | Counts et al. |
| 7,933,929 B1 | 4/2011 | McClendon et al. |
| 7,941,188 B2 | 5/2011 | Jung et al. |
| 7,970,418 B2 | 6/2011 | Schmidt et al. |
| 7,991,432 B2 | 8/2011 | Silverbrook et al. |
| 8,036,630 B2 | 10/2011 | Park et al. |
| 8,046,009 B2 | 10/2011 | Bodmer et al. |
| 8,073,565 B2 | 12/2011 | Johnson |
| 8,082,094 B2 | 12/2011 | Gao |
| 8,250,634 B2 | 8/2012 | Agarwal et al. |
| 8,332,878 B2 | 12/2012 | Harm |
| 2001/0018349 A1 | 8/2001 | Kinnunen et al. |
| 2001/0046884 A1 | 11/2001 | Yoshioka |
| 2002/0032035 A1 | 3/2002 | Teshima |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0055373 A1 | 5/2002 | King et al. |
| 2002/0067353 A1 | 6/2002 | Kenyon et al. |
| 2002/0077144 A1 | 6/2002 | Keller et al. |
| 2002/0087505 A1 | 7/2002 | Smith et al. |
| 2002/0091991 A1 | 7/2002 | Castro |
| 2002/0095486 A1 | 7/2002 | Bahl |
| 2002/0118112 A1 | 8/2002 | Lang |
| 2002/0126146 A1* | 9/2002 | Burns et al. ............ 345/752 |
| 2002/0128773 A1 | 9/2002 | Chowanic et al. |
| 2002/0132625 A1 | 9/2002 | Ogino et al. |
| 2002/0140560 A1 | 10/2002 | Altman et al. |
| 2002/0160815 A1 | 10/2002 | Patel et al. |
| 2002/0167442 A1 | 11/2002 | Taylor |
| 2002/0173905 A1 | 11/2002 | Jin et al. |
| 2003/0014181 A1 | 1/2003 | Myr |
| 2003/0016804 A1* | 1/2003 | Sheha et al. ............ 379/201.06 |
| 2003/0032404 A1 | 2/2003 | Wager et al. |
| 2003/0055560 A1 | 3/2003 | Phillips et al. |
| 2003/0060212 A1 | 3/2003 | Thomas |
| 2003/0060215 A1 | 3/2003 | Graham |
| 2003/0060973 A1 | 3/2003 | Mathews et al. |
| 2003/0060976 A1 | 3/2003 | Sato et al. |
| 2003/0065934 A1 | 4/2003 | Angelo et al. |
| 2003/0069029 A1 | 4/2003 | Dowling et al. |
| 2003/0069683 A1 | 4/2003 | Lapidot et al. |
| 2003/0078054 A1 | 4/2003 | Okuda |
| 2003/0078055 A1 | 4/2003 | Smith et al. |
| 2003/0078057 A1 | 4/2003 | Watanabe et al. |
| 2003/0093217 A1 | 5/2003 | Petzold et al. |
| 2003/0096620 A1 | 5/2003 | Ozturk et al. |
| 2003/0100326 A1 | 5/2003 | Grube et al. |
| 2003/0100334 A1 | 5/2003 | Mazzara, Jr. |
| 2003/0101225 A1 | 5/2003 | Han et al. |
| 2003/0105826 A1* | 6/2003 | Mayraz ............ 709/206 |
| 2003/0120423 A1 | 6/2003 | Cochlovius et al. |
| 2003/0134657 A1 | 7/2003 | Norta et al. |
| 2003/0140136 A1 | 7/2003 | Nakamura |
| 2003/0144793 A1 | 7/2003 | Melaku et al. |
| 2003/0148774 A1 | 8/2003 | Naghian et al. |
| 2003/0158655 A1 | 8/2003 | Obradovich et al. |
| 2003/0191578 A1 | 10/2003 | Paulauskas et al. |
| 2003/0236106 A1 | 12/2003 | Master et al. |
| 2004/0010358 A1 | 1/2004 | Oesterling et al. |
| 2004/0036649 A1 | 2/2004 | Taylor |
| 2004/0054428 A1 | 3/2004 | Sheha et al. |
| 2004/0059502 A1 | 3/2004 | Levi et al. |
| 2004/0068439 A1 | 4/2004 | Elgrably |
| 2004/0072557 A1 | 4/2004 | Paila et al. |
| 2004/0072577 A1 | 4/2004 | Myllymaki et al. |
| 2004/0073361 A1 | 4/2004 | Tzamaloukas et al. |
| 2004/0082351 A1 | 4/2004 | Westman |
| 2004/0083050 A1* | 4/2004 | Biyani ............ 701/200 |
| 2004/0093155 A1 | 5/2004 | Simonds |
| 2004/0093392 A1 | 5/2004 | Nagamatsu et al. |
| 2004/0093566 A1* | 5/2004 | McElligott ............ 715/531 |
| 2004/0098175 A1 | 5/2004 | Said et al. |
| 2004/0104842 A1 | 6/2004 | Drury et al. |
| 2004/0110515 A1 | 6/2004 | Blumberg et al. |
| 2004/0128067 A1 | 7/2004 | Smith |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0180669 A1 | 9/2004 | Kall |
| 2004/0192299 A1* | 9/2004 | Wilson et al. ............ 455/433 |
| 2004/0198335 A1 | 10/2004 | Campen |
| 2004/0198379 A1 | 10/2004 | Magee et al. |
| 2004/0198397 A1 | 10/2004 | Weiss |
| 2004/0203569 A1 | 10/2004 | Jijina et al. |
| 2004/0203746 A1 | 10/2004 | Knauerhase et al. |
| 2004/0203836 A1 | 10/2004 | Gorday et al. |
| 2004/0203880 A1 | 10/2004 | Riley |
| 2004/0203909 A1 | 10/2004 | Koster |
| 2004/0204842 A1 | 10/2004 | Shinozaki |
| 2004/0215707 A1 | 10/2004 | Fujita et al. |
| 2004/0225436 A1 | 11/2004 | Yoshihashi |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260939 A1 | 12/2004 | Ichikawa et al. |
| 2004/0263084 A1 | 12/2004 | Mor et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0009511 A1 | 1/2005 | Bostrom et al. |
| 2005/0027442 A1 | 2/2005 | Kelley et al. |
| 2005/0033509 A1 | 2/2005 | Clapper |
| 2005/0033515 A1 | 2/2005 | Bozzone |
| 2005/0037781 A1 | 2/2005 | Ozugur et al. |
| 2005/0039140 A1 | 2/2005 | Chen |
| 2005/0046584 A1 | 3/2005 | Breed |
| 2005/0071078 A1 | 3/2005 | Yamada et al. |
| 2005/0071702 A1 | 3/2005 | Morisawa |
| 2005/0075116 A1 | 4/2005 | Laird |
| 2005/0085272 A1 | 4/2005 | Anderson et al. |
| 2005/0091408 A1 | 4/2005 | Parupudi et al. |
| 2005/0096840 A1 | 5/2005 | Simske |
| 2005/0114021 A1 | 5/2005 | Krull et al. |
| 2005/0130677 A1 | 6/2005 | Meunier et al. |
| 2005/0134440 A1 | 6/2005 | Breed |
| 2005/0134578 A1 | 6/2005 | Chambers et al. |
| 2005/0149250 A1 | 7/2005 | Isaac |
| 2005/0153681 A1 | 7/2005 | Hanson |
| 2005/0176411 A1 | 8/2005 | Taya |
| 2005/0186954 A1 | 8/2005 | Kenney |
| 2005/0192025 A1 | 9/2005 | Kaplan |
| 2005/0197767 A1 | 9/2005 | Nortrup |
| 2005/0203698 A1 | 9/2005 | Lee |
| 2005/0221799 A1 | 10/2005 | Tervo et al. |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0222763 A1 | 10/2005 | Uyeki |
| 2005/0227709 A1 | 10/2005 | Chang et al. |
| 2005/0228860 A1 | 10/2005 | Hamynen et al. |
| 2005/0234637 A1 | 10/2005 | Obradovich et al. |
| 2005/0239477 A1 | 10/2005 | Kim et al. |
| 2005/0250440 A1 | 11/2005 | Zhou et al. |
| 2005/0256639 A1 | 11/2005 | Aleksic et al. |
| 2005/0286421 A1 | 12/2005 | Janacek |
| 2006/0009908 A1 | 1/2006 | Tomita et al. |
| 2006/0015249 A1 | 1/2006 | Gieseke |

(56) References Cited

U.S. PATENT DOCUMENTS

| | | |
|---|---|---|
| 2006/0022048 A1 | 2/2006 | Johnson |
| 2006/0025158 A1 | 2/2006 | Leblanc et al. |
| 2006/0029109 A1 | 2/2006 | Moran |
| 2006/0038719 A1 | 2/2006 | Pande et al. |
| 2006/0041374 A1 | 2/2006 | Inoue |
| 2006/0041377 A1 | 2/2006 | Jung et al. |
| 2006/0041378 A1 | 2/2006 | Cheng et al. |
| 2006/0056388 A1 | 3/2006 | Livingood |
| 2006/0058955 A1 | 3/2006 | Mehren |
| 2006/0063539 A1 | 3/2006 | Beyer, Jr. |
| 2006/0064239 A1 | 3/2006 | Ishii |
| 2006/0068809 A1 | 3/2006 | Wengler et al. |
| 2006/0069503 A1 | 3/2006 | Suomela |
| 2006/0085392 A1 | 4/2006 | Wang et al. |
| 2006/0094353 A1 | 5/2006 | Nielsen et al. |
| 2006/0101005 A1 | 5/2006 | Yang et al. |
| 2006/0111122 A1 | 5/2006 | Carlsan et al. |
| 2006/0116137 A1 | 6/2006 | Jung |
| 2006/0148463 A1 | 7/2006 | Zhu et al. |
| 2006/0149461 A1 | 7/2006 | Rowley |
| 2006/0150119 A1 | 7/2006 | Chesnais et al. |
| 2006/0166679 A1 | 7/2006 | Karaoguz et al. |
| 2006/0168300 A1 | 7/2006 | An et al. |
| 2006/0172769 A1 | 8/2006 | Oh |
| 2006/0172778 A1 | 8/2006 | Sundararajan et al. |
| 2006/0179114 A1* | 8/2006 | Deeds ........................ 709/206 |
| 2006/0180649 A1 | 8/2006 | Casey |
| 2006/0184320 A1 | 8/2006 | Hong |
| 2006/0184978 A1 | 8/2006 | Casey |
| 2006/0195481 A1 | 8/2006 | Arrouye et al. |
| 2006/0199567 A1 | 9/2006 | Alston |
| 2006/0199612 A1* | 9/2006 | Beyer et al. ................ 455/556.2 |
| 2006/0202819 A1 | 9/2006 | Adamczyk et al. |
| 2006/0211453 A1 | 9/2006 | Schick |
| 2006/0218209 A1 | 9/2006 | Arrouye et al. |
| 2006/0227047 A1 | 10/2006 | Rosenberg |
| 2006/0229802 A1 | 10/2006 | Vertelney et al. |
| 2006/0247855 A1 | 11/2006 | de Silva et al. |
| 2006/0251034 A1 | 11/2006 | Park |
| 2006/0270421 A1 | 11/2006 | Phillips et al. |
| 2006/0271280 A1 | 11/2006 | O'Clair |
| 2006/0284767 A1 | 12/2006 | Taylor |
| 2006/0287824 A1 | 12/2006 | Lin |
| 2006/0291639 A1 | 12/2006 | Radziewicz et al. |
| 2006/0293029 A1 | 12/2006 | Jha et al. |
| 2006/0293083 A1* | 12/2006 | Bowen ........................ 455/558 |
| 2007/0001875 A1 | 1/2007 | Taylor |
| 2007/0003040 A1 | 1/2007 | Radziewicz et al. |
| 2007/0005188 A1 | 1/2007 | Johnson |
| 2007/0005233 A1 | 1/2007 | Pinkus et al. |
| 2007/0006098 A1 | 1/2007 | Krumm et al. |
| 2007/0008515 A1 | 1/2007 | Otani et al. |
| 2007/0010942 A1 | 1/2007 | Bill |
| 2007/0016362 A1 | 1/2007 | Nelson |
| 2007/0027614 A1 | 2/2007 | Reeser et al. |
| 2007/0027628 A1 | 2/2007 | Geelen |
| 2007/0038364 A1 | 2/2007 | Lee et al. |
| 2007/0038369 A1 | 2/2007 | Devries et al. |
| 2007/0042790 A1 | 2/2007 | Mohi et al. |
| 2007/0055684 A1 | 3/2007 | Stevens |
| 2007/0060328 A1 | 3/2007 | Zrike et al. |
| 2007/0061245 A1 | 3/2007 | Ramer et al. |
| 2007/0061301 A1 | 3/2007 | Ramer et al. |
| 2007/0061363 A1 | 3/2007 | Ramer et al. |
| 2007/0071114 A1 | 3/2007 | Sanderford et al. |
| 2007/0073480 A1 | 3/2007 | Singh |
| 2007/0073719 A1 | 3/2007 | Ramer et al. |
| 2007/0087726 A1 | 4/2007 | McGary et al. |
| 2007/0093258 A1 | 4/2007 | Steenstra et al. |
| 2007/0093955 A1 | 4/2007 | Hughes |
| 2007/0106465 A1 | 5/2007 | Adam et al. |
| 2007/0115868 A1 | 5/2007 | Chen et al. |
| 2007/0124043 A1 | 5/2007 | Ayoub et al. |
| 2007/0124058 A1 | 5/2007 | Kitagawa et al. |
| 2007/0124066 A1 | 5/2007 | Kikuchi |
| 2007/0127439 A1 | 5/2007 | Yokoyama |
| 2007/0127661 A1 | 6/2007 | Didcock |
| 2007/0129888 A1 | 6/2007 | Rosenberg |
| 2007/0130153 A1 | 6/2007 | Nachman et al. |
| 2007/0135136 A1 | 6/2007 | Ische |
| 2007/0135990 A1 | 6/2007 | Seymour et al. |
| 2007/0142026 A1 | 6/2007 | Kuz et al. |
| 2007/0149212 A1 | 6/2007 | Gupta et al. |
| 2007/0150192 A1 | 6/2007 | Wakamatsu et al. |
| 2007/0150320 A1 | 6/2007 | Huang |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0155360 A1 | 7/2007 | An |
| 2007/0155404 A1 | 7/2007 | Yamane et al. |
| 2007/0156326 A1 | 7/2007 | Nesbitt |
| 2007/0156337 A1 | 7/2007 | Yanni |
| 2007/0162224 A1 | 7/2007 | Luo |
| 2007/0179854 A1 | 8/2007 | Ziv et al. |
| 2007/0184855 A1 | 8/2007 | Klassen |
| 2007/0191029 A1 | 8/2007 | Zarem et al. |
| 2007/0198304 A1 | 8/2007 | Cohen et al. |
| 2007/0200713 A1 | 8/2007 | Weber et al. |
| 2007/0202887 A1 | 8/2007 | Counts et al. |
| 2007/0204218 A1 | 8/2007 | Weber et al. |
| 2007/0206730 A1 | 9/2007 | Polk |
| 2007/0208492 A1 | 9/2007 | Downs et al. |
| 2007/0208497 A1 | 9/2007 | Downs et al. |
| 2007/0208498 A1 | 9/2007 | Barker et al. |
| 2007/0208507 A1 | 9/2007 | Gotoh |
| 2007/0219706 A1 | 9/2007 | Sheynblat |
| 2007/0229549 A1 | 10/2007 | Dicke et al. |
| 2007/0232326 A1 | 10/2007 | Johnson |
| 2007/0233387 A1 | 10/2007 | Johnson |
| 2007/0238491 A1 | 10/2007 | He |
| 2007/0243853 A1 | 10/2007 | Bumiller et al. |
| 2007/0247435 A1* | 10/2007 | Benko ........................ 345/173 |
| 2007/0254676 A1 | 11/2007 | Pedigo et al. |
| 2007/0259674 A1 | 11/2007 | Neef et al. |
| 2007/0260751 A1 | 11/2007 | Meesseman |
| 2007/0266116 A1* | 11/2007 | Rensin et al. ................ 709/217 |
| 2007/0270159 A1* | 11/2007 | Lohtia et al. ................ 455/456.1 |
| 2007/0271328 A1 | 11/2007 | Geelen et al. |
| 2007/0276586 A1 | 11/2007 | Jeon et al. |
| 2007/0276587 A1 | 11/2007 | Johnson |
| 2007/0276596 A1 | 11/2007 | Solomon et al. |
| 2007/0282521 A1 | 12/2007 | Broughton |
| 2007/0282565 A1 | 12/2007 | Bye et al. |
| 2007/0290920 A1 | 12/2007 | Shintai et al. |
| 2007/0299601 A1 | 12/2007 | Zhao et al. |
| 2008/0004789 A1 | 1/2008 | Horvitz et al. |
| 2008/0004791 A1 | 1/2008 | Sera |
| 2008/0004802 A1 | 1/2008 | Horvitz |
| 2008/0005104 A1 | 1/2008 | Flake et al. |
| 2008/0005301 A1 | 1/2008 | Li et al. |
| 2008/0015422 A1 | 1/2008 | Wessel |
| 2008/0021632 A1 | 1/2008 | Amano |
| 2008/0024360 A1 | 1/2008 | Taylor |
| 2008/0024364 A1 | 1/2008 | Taylor |
| 2008/0027636 A1 | 1/2008 | Tengler et al. |
| 2008/0030308 A1 | 2/2008 | Johnson |
| 2008/0032703 A1 | 2/2008 | Krumm et al. |
| 2008/0032721 A1 | 2/2008 | MacDonald et al. |
| 2008/0045234 A1 | 2/2008 | Reed |
| 2008/0046176 A1 | 2/2008 | Jurgens |
| 2008/0052407 A1 | 2/2008 | Baudino et al. |
| 2008/0065311 A1 | 3/2008 | Bauchot et al. |
| 2008/0070593 A1 | 3/2008 | Altman et al. |
| 2008/0071466 A1 | 3/2008 | Downs et al. |
| 2008/0082254 A1 | 4/2008 | Huhtala et al. |
| 2008/0085727 A1 | 4/2008 | Kratz |
| 2008/0086240 A1 | 4/2008 | Breed |
| 2008/0088486 A1 | 4/2008 | Rozum et al. |
| 2008/0091347 A1 | 4/2008 | Tashiro |
| 2008/0096518 A1 | 4/2008 | Mock et al. |
| 2008/0097698 A1 | 4/2008 | Arnold-Huyser et al. |
| 2008/0098090 A1 | 4/2008 | Geraci et al. |
| 2008/0104634 A1 | 5/2008 | Gajdos et al. |
| 2008/0109153 A1 | 5/2008 | Gueziec |

(56) References Cited

U.S. PATENT DOCUMENTS

| | | |
|---|---|---|
| 2008/0113672 A1 | 5/2008 | Karr et al. |
| 2008/0129528 A1 | 6/2008 | Guthrie |
| 2008/0132243 A1 | 6/2008 | Spalink et al. |
| 2008/0132251 A1 | 6/2008 | Altman et al. |
| 2008/0132252 A1 | 6/2008 | Altman et al. |
| 2008/0140308 A1 | 6/2008 | Yamane et al. |
| 2008/0140520 A1 | 6/2008 | Hyder et al. |
| 2008/0153512 A1 | 6/2008 | Kale et al. |
| 2008/0153513 A1 | 6/2008 | Flake et al. |
| 2008/0155453 A1 | 6/2008 | Othmer |
| 2008/0160956 A1 | 7/2008 | Jackson et al. |
| 2008/0161034 A1 | 7/2008 | Akiyama |
| 2008/0167083 A1 | 7/2008 | Wyld et al. |
| 2008/0167796 A1* | 7/2008 | Narayanaswami ............ 701/200 |
| 2008/0167811 A1 | 7/2008 | Geelen |
| 2008/0172173 A1 | 7/2008 | Chang et al. |
| 2008/0172361 A1 | 7/2008 | Wong et al. |
| 2008/0172374 A1 | 7/2008 | Wolosin et al. |
| 2008/0176545 A1 | 7/2008 | Dicke |
| 2008/0177793 A1 | 7/2008 | Epstein et al. |
| 2008/0178116 A1 | 7/2008 | Kim |
| 2008/0186162 A1 | 8/2008 | Rajan et al. |
| 2008/0189033 A1 | 8/2008 | Geelen et al. |
| 2008/0194273 A1 | 8/2008 | Kansal et al. |
| 2008/0200142 A1 | 8/2008 | Abdel-Kader et al. |
| 2008/0207167 A1 | 8/2008 | Bugenhagen |
| 2008/0225779 A1 | 9/2008 | Bragiel et al. |
| 2008/0227473 A1 | 9/2008 | Haney |
| 2008/0242312 A1* | 10/2008 | Paulson et al. .............. 455/456.1 |
| 2008/0248815 A1 | 10/2008 | Busch |
| 2008/0249667 A1 | 10/2008 | Horvitz et al. |
| 2008/0268876 A1 | 10/2008 | Gelfand et al. |
| 2008/0271072 A1 | 10/2008 | Rothschild et al. |
| 2008/0280600 A1* | 11/2008 | Zhou ............................ 455/415 |
| 2008/0284642 A1 | 11/2008 | Seacat et al. |
| 2008/0287124 A1 | 11/2008 | Karabinis |
| 2008/0288166 A1 | 11/2008 | Onishi et al. |
| 2008/0293397 A1 | 11/2008 | Gajdos et al. |
| 2008/0310850 A1 | 12/2008 | Pederson et al. |
| 2008/0318550 A1 | 12/2008 | DeAtley |
| 2008/0319644 A1 | 12/2008 | Zehler |
| 2008/0319652 A1 | 12/2008 | Moshfeghi |
| 2009/0003659 A1 | 1/2009 | Forstall et al. |
| 2009/0005005 A1 | 1/2009 | Forstall et al. |
| 2009/0005018 A1 | 1/2009 | Forstall et al. |
| 2009/0005021 A1 | 1/2009 | Forstall et al. |
| 2009/0005068 A1 | 1/2009 | Forstall et al. |
| 2009/0005070 A1 | 1/2009 | Forstall et al. |
| 2009/0005071 A1 | 1/2009 | Forstall et al. |
| 2009/0005076 A1 | 1/2009 | Forstall et al. |
| 2009/0005080 A1 | 1/2009 | Forstall et al. |
| 2009/0005082 A1 | 1/2009 | Forstall et al. |
| 2009/0005964 A1 | 1/2009 | Forstall et al. |
| 2009/0005965 A1 | 1/2009 | Forstall et al. |
| 2009/0005975 A1 | 1/2009 | Forstall et al. |
| 2009/0005978 A1 | 1/2009 | Forstall et al. |
| 2009/0005981 A1 | 1/2009 | Forstall et al. |
| 2009/0006336 A1 | 1/2009 | Forstall et al. |
| 2009/0030605 A1 | 1/2009 | Breed |
| 2009/0031006 A1 | 1/2009 | Johnson |
| 2009/0033540 A1 | 2/2009 | Breed et al. |
| 2009/0042585 A1 | 2/2009 | Matsuda |
| 2009/0089706 A1 | 4/2009 | Furches et al. |
| 2009/0098857 A1 | 4/2009 | DeAtley |
| 2009/0177385 A1 | 7/2009 | Matas et al. |
| 2009/0197612 A1 | 8/2009 | Kiiskinen |
| 2009/0228961 A1 | 9/2009 | Wald et al. |
| 2009/0234743 A1 | 9/2009 | Wald et al. |
| 2009/0259573 A1 | 10/2009 | Cheng et al. |
| 2009/0271271 A1 | 10/2009 | Johnson |
| 2009/0281724 A1 | 11/2009 | Blumenberg et al. |
| 2009/0286549 A1 | 11/2009 | Sazegari et al. |
| 2010/0076818 A1 | 3/2010 | Peterson et al. |
| 2010/0082820 A1 | 4/2010 | Furukawa |
| 2010/0106397 A1 | 4/2010 | Van Essen |
| 2010/0120450 A1 | 5/2010 | Herz |
| 2010/0128935 A1 | 5/2010 | Filley et al. |
| 2010/0131584 A1 | 5/2010 | Johnson |
| 2010/0173647 A1 | 7/2010 | Sheynblat |
| 2010/0207782 A1 | 8/2010 | Johnson |
| 2010/0285817 A1 | 11/2010 | Zhao et al. |
| 2011/0051658 A1 | 3/2011 | Jin et al. |
| 2011/0159887 A1* | 6/2011 | Lohtia et al. ................ 455/456.1 |

FOREIGN PATENT DOCUMENTS

| | | |
|---|---|---|
| CA | 2287596 | 4/2000 |
| CA | 2432239 | 12/2004 |
| CN | 1 412 573 | 4/2003 |
| DE | 3 621 456 | 1/1988 |
| DE | 4437360 | 4/1996 |
| DE | 19506890 | 8/1996 |
| DE | 19914257 | 3/1999 |
| DE | 10 141 695 | 3/2003 |
| EP | 0 288 068 | 7/1992 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 786 646 | 7/1997 |
| EP | 785535 | 7/1997 |
| EP | 0 809 117 | 11/1997 |
| EP | 0 813 072 | 12/1997 |
| EP | 0 699 330 | 4/1998 |
| EP | 0 908 835 | 4/1999 |
| EP | 0 997 808 | 5/2000 |
| EP | 1 083 764 | 3/2001 |
| EP | 1 251 362 | 10/2002 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1 672 474 | 6/2006 |
| EP | 1 790 947 | 5/2007 |
| EP | 1 860 904 | 11/2007 |
| EP | 1 944 701 | 7/2008 |
| EP | 1 933 249 | 8/2008 |
| EP | 1 975 567 | 10/2008 |
| FR | 2730083 | 8/1996 |
| FR | 2754093 | 4/1998 |
| FR | 2272911 | 6/1999 |
| FR | 2810183 | 12/2001 |
| GB | 2 278 196 | 11/1994 |
| GB | 2 322 248 | 8/1998 |
| GB | 2 359 888 | 5/2001 |
| GB | 2 407 230 | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 08-069436 | 3/1996 |
| JP | 09-054895 | 2/1997 |
| JP | 09-098474 | 4/1997 |
| JP | 9-113288 | 5/1997 |
| JP | 09-153125 | 6/1997 |
| JP | 9-062993 | 7/1997 |
| JP | 09-200850 | 7/1997 |
| JP | 9-210710 | 8/1997 |
| JP | 9-319300 | 12/1997 |
| JP | 10-021259 | 1/1998 |
| JP | 11-234736 | 8/1999 |
| JP | 2000-163379 | 6/2000 |
| JP | 2001-008270 | 1/2001 |
| JP | 2001-160063 | 6/2001 |
| JP | 2002-310680 | 10/2002 |
| JP | 10-030933 | 2/2003 |
| JP | 2003-228532 | 8/2003 |
| JP | 2004-045054 | 2/2004 |
| JP | 2004-219146 | 8/2004 |
| JP | 2004-362271 | 12/2004 |
| JP | 2005-106741 | 4/2005 |

(56) References Cited

FOREIGN PATENT DOCUMENTS

| | | |
|---|---|---|
| JP | 2005-182146 | 7/2005 |
| JP | 2005-241519 | 9/2005 |
| JP | 2005/277764 | 10/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | WO 93/20546 | 10/1993 |
| WO | WO 94/08250 | 4/1994 |
| WO | WO 97/07467 | 2/1997 |
| WO | WO 97/24577 | 7/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 02/33533 | 4/2002 |
| WO | WO 02/054813 | 7/2002 |
| WO | WO 03/023593 | 3/2003 |
| WO | WO 03/096055 | 11/2003 |
| WO | WO 2004/008792 | 1/2004 |
| WO | WO 2004/16032 | 2/2004 |
| WO | WO 2004/021730 | 3/2004 |
| WO | WO 2004/34194 | 4/2004 |
| WO | WO 2004/061576 | 7/2004 |
| WO | WO 2004/076977 | 9/2004 |
| WO | WO 2005/006258 | 1/2005 |
| WO | WO 2005/84052 | 9/2005 |
| WO | WO 2006/065856 | 6/2006 |
| WO | WO 2006/113125 | 10/2006 |
| WO | WO 2007/27065 | 3/2007 |
| WO | WO 2007/052285 | 5/2007 |
| WO | WO 2008/051929 | 5/2008 |
| WO | WO 2008/085740 | 7/2008 |
| WO | WO 2009/02942 | 12/2008 |
| WO | WO 2009/140031 | 11/2009 |

OTHER PUBLICATIONS

"Error: could not finda contact with this e-mail address". Outlookbanter.com. Dec. 2006.*
Binzhuo et al., "Mobile Phone GIS Based on Mobile SVG", IEEE 2005.
Nardi et al., "Integrating Communication and Information through Contact Map", Communications of the ACM, vol. 45, No. 4, Apr. 2002.
Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.
Jain, R., Potential Networking Applications of Global Positioning Systems (GPS) [online] [retrieved on Nov. 18, 2008] [http://arxiv.org/ftp/cs/papers/9809/9809079.pdf] OSU Technical Report TR-24, Apr. 1996, pp. 1-40.
International Search Report and Written Opinion, dated Jun. 9, 2008, issued in International Application No. PCT/US2007/088880, filed Dec. 27, 2007.
Spohrer. "New Paradigms for Using Computers", 1997; retrieved from the Internet, URL: <http://almaden.ibm.com/npuc97/1997/spohrer.htm>.
Yang et al. "Global Snapshots for Distributed Debugging", IEEE, pp. 436-440, 1992.
"Cyberguide: a mobile context-aware tour guide", Wireless Networks Archive (Special Issue: Mobile computing and networking; selecting papers from MobiCom '96), 3(5):421-433, 1997.
"Frontiers in electronic media", Interactions Archive 4(4):32-64, 1997.
"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.
Sharpe et al., U.S. Appl. No. 12/434,586, filed May 1, 2009.
Sharp et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Drane et al., "The accurate location of mobile telephones", Third Annual World Congress on Intelligent Transport Systems, Orlando, Florida, Oct. 1996.
"Travel Time Data Collection Handbook—Chapter 5: Its Probe Vehicle Techniques", FHWA-PL-98- 035 Report, Department of Transport, University of Texas, Mar. 1998; [online] [Retrieved from the Internet at http://www.fhwa.dot.gov/ohim/handbook/chap5.pdf.
Ygnace et al., "Travel Time Estimation on the San Francisco Bay Area Network Using Cellular Phones as Probes", Working Paper, Institute of Transportation Studies, University of California, Berkeley, 2000.
Wang et al., "A Unified Vehicle Supervising and Traffic Information System", IEEE, 1996, pp. 968-972.
U.S. Appl. No. 12135073, Johnson, filed Mar. 27, 2008.
"New program for mobile blogging for Pocket PC released: MY BLOG," [online] [Retrieved on Apr. 5, 2006]; Retrieved from the Internet URL: http://msmobiles.com/news.php/4067.html; 1 page.
"Numbering and Dialing Plan Within the United States," *Alliance for Telecommunications Industry Solutions*, 2005, 17 pages.
Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt =Auvf3s6LQK_p0aJlb954T_DQn6gB; 1 page.
Maxwell et al., "Alfred: The Robot Waiter Who Remembers You," *AAAI Technical Report WS*-99-15, 1999, 12 pages.
Shibata et al., "Development and Integration of Generic Components for a Teachable Vision-Based Mobile Robot," IEEE/ASME *Transactions on Mechatronics*, 1996, 1(3):230-236.
Wu et al., "A Multimedia System for Route Sharing and Video-Based Navigation," *IEEE*, 2006, pp. 73-76.
Yogesh C. Rathod, Third Party Submission in U.S. Appl. No. 12/233,358 mailed Mar. 30, 2010, 12 pages.
Feddema et al., "Cooperative Sentry Vehicles and Differential GPS Leapfrog," 2000, United States Department of Energy, pp. 1-12.
U.S. Appl. No. 11/464,671, Johnson, filed Aug. 15, 2006
U.S. Appl. No. 11/827,065, Johnson, filed Jul. 10, 2007.
U.S. Appl. No. 11/972,559, Alten, filed Jan. 10, 2008.
U.S. Appl. No. 12/044,363, Johnson, filed Mar. 7, 2008.
U.S. Appl. No. 11/114,714, Williamson et al., filed May 2, 2008
U.S. Appl. No. 12/119,316, Blumenberg et al., filed May 12, 2008.
U.S. Appl. No. 12/122,339, Sazegari et al., filed May 16, 2008.
U.S. Appl. No. 12/233,358, Low et al., filed Nov. 13, 2008.
U.S. Appl. No. 12/270,814, Herz, filed Nov. 13, 2008.

(56) References Cited

OTHER PUBLICATIONS

"27 Countries in your pocket"; [online] [Retrieved on Sep. 29, 2005] Retrieved from the Internet <URL http://www.mio-tech.be/en/printview/press-releases-2005-09-29.htm; 1 page.
"Animated Transition"; [online] [Retrieved on Oct. 16, 2006] Retrieved from the Internet <URL: http://designinterfaces.com/Animated_Transition; 2 pages.
"DaimlerCrysler Guide5 Usecases Overview Map", 1 page (no reference date).
"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.
"Mio 269+ Users Manula"; 2005; 44 pages.
Review Guide—Google Maps for mobile (beta); Google; 2006; 7 pages.
"User-centered design of mobile solutions", NAMAHN, 2006, 18 pages.
"User's Manual MioMap 2.0"; Aug. 2005; 60 pages.
"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.
"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.
"Windows Mobile"; Microsoft; 2007, 2 pages.
Anand et al., "Quantitative Analysis of Power Consumption for Location-Aware Applications on Smart Phones", IEEE International Symposium on Industrial Electronics, 2007.
Beard et al., "Estimating Positions and Paths of Moving Objects", IEEE 2000, pp. 1-8.
Bederson, B.B., Audio Augmented Reality: A Prototype Automated Tour Guide [online] [retrieved on Aug. 30, 2002] [http://www.cs.umd.edu/~bederson/papers/chi-95-aar/] pp. 1-4.
Berman et al., "The Role of Dead Reckoning and Inertial Sensors in Future General Aviation Navigation", IEEE, 1998, pp. 510-517.
Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.
Bokharouss et al., "A Location-Aware Mobile Call Handling Assistant", International Conference on Advanced Information Networking and Applications Workshops, 2007.
Boonsrimuang et al., "Mobile Internet Navigation System", IEEE, 2002, pp. 325-328.
Camp et al., "A computer-based method for predicting transit time systems", Decsision Sciences, vol. 5, pp. 339-346, 1974.
Carew; "Phones that tell you where to drive, meet, eat"; [online] [Retrieved May 26, 2007]; Retrieved from the Internet <URL htttp://news.yahoo.com/s/nm/20070525/wr_nm/column_pluggedin_dc_2&printer=1;_ylt=Ahqaftn7x m1S2rOFZFeu9G4ht.cA; 2 pages.
Cho et al., A Traveler Information Service Structure in Hybrid T-DMB and Cellular Communication Network, Broadcast Systems Research Group, IEEE, 2006, pp. 747-750.
Christie et al., "Development and Deployment of GPS wireless devices for E911 and Location based services", IEEE 2002.
Chua et al., "Intelligent Portal for Event-triggered SMS Alerts", 2nd International Conference on Mobile Technology, Applications and Systems, 2005.
Civilis et al., "Efficient Tracking of Moving Objects with Precision Guarantees", IEEE, Proceedings of the First Annual International Conference on Mobile and Ubiquitous Systems: Networking and Services, 2004, 10 pages.
Dibdin, Peter, "Where are mobile location based services?", Dec. 14, 2001, pp. 1-8.
Dunn et al., "Wireless Emergency Call System", IBM TDB, Sep. 1994.

Ebine, "Dual Frequency resonant base station antennas for PDC systems in Japan", IEEE, pp. 564-567, 1999.
Evans, "In-Vehicle Man-Machine Interaction the Socrates Approach", Vehicle Navigation & Information System Conference Proceedings, 1994, Aug.,31,—Sep. 2, 1994, pp. 473-477.
FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.d11/fm/3-25.26/toc.htm] 20 Jul. 2001, pp. 1-7 and J-1 to J-3.
GPS 12 *Personal Navigator Owner's Manual & Reference*, Garmin Corporation, Jan. 1999, pp. 1-60.
Guo et al., "An Intelligent Query System based on Chinese Short Message Service for Restaurant Recommendation", IEEE 2007, 1 page.
Hameed et al., "An Intelligent Agent-Based Medication and Emergency System", IEEE 2006.
Helal et al., "Drishti: An Integrated Navigation System for Visually Impaired and Disabled", Fifth International Symposium on Wearable Computers (ISWC'01), IEEE, 2001, pp. 149-156.
Hohman et al., "GPS Roadside Integrated Precision Positioning System", Position Location and Navigation Symposium (IEEE 2000), pp. 221-230.
International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.
Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.
Ju et al., "RFID Data Collection and Integration based on Mobile Agent", IEEE, 2006.
Kbar et al., "Mobile Station Location based on Hybrid of Signal Strength and Time of Arrival", IEEE, 2005.
Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.
Lloyd et al., "Cellular phone base stations installation violate the Electromagnetic Compatibility regulations", IEEE, 2004.
Manabe et al., "On the M-CubITS Pedestrian Navigation System", IEEE, 2006, pp. 793-798.
Meier et al., "Location-Aware Event-Base Middleware: A Paradigm for Collaborative Mobile Applications?", Sep. 2003.
Miller et al., "Synchronization of Mobile XML Databases by Utilizing Deferred Views", IEEE 2004.
Northard, "Docking Station Communication Link", IBM TDB, Feb. 1994.
Oh et al., "Spatial Applications Using 4S Technology for Mobile Environment", IEEE 2002.
Paksoy et al., "The Global Position System-Navigation Tool of the Future", Journal of Electrical & Electronics, 2002, vol. 2, No. 1, pp. 467-476.
Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.
Partial International Search Report, dated Jul. 29, 2008, issued in corresponding PCT/US2008/050295.
Pfoser et al., "Dynamic Travel Time Maps—Enabling Efficient Navigation", Proceedings of the 18th International Conference on Scientific and Statistical Database Management (SSDBM'06), IEEE, 10 pages.
Portfolio 2007; [online] [Retrieved on Jun. 14, 2007]; Retrieved from the Internet, URL: http://eric.wahlforss.com/folio; 3 pages.
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto, J., *Augment-able Reality: Situated Communication through Physical and Digital Spaces, iswc,* pp. 68, Second International Symposium on Wearable computers (ISWC'98), 1998, pp. 1-8.

(56) References Cited

OTHER PUBLICATIONS

Rogers et al., "Adaptive User Interfaces for Automotive Environments", IEEE Intelligent Vehicles Symposium 2000, Oct. 3-5, 2000, pp. 662-667.
Rozier, J., *Hear & There: An Augmented Reality System of Linked Audio*, Proceedings of the International Conference on Auditory Display, Atlanta, GA, Apr. 2000, pp. 1-6.
Samadani et al., "PathMaker: Systems for Capturing Trips", IEEE (2004) International Conference on Multimedia and Expo., Publication Date: Jun. 27-30, 2004, vol. 3, pp. 2123-2126, 2004.
Schreiner, "Where We At? Mobile Phones Bring GPS to the Masses", IEEE Computers Society, May/Jun. 2007, pp. 6-11.
Sung et al., "Towards Reliable Peer-to-Peer Data Sharing over Mobile Ad hoc Networks", IEEE, 2005.
Weib et al., "Zone services—an approach for location-based data collection", Proceedings of the 8th International Conference on E-commerce Technology and the 3rd IEEE International Conference on Enterprise Computing, E-Commerce and E-Services.
Yang et al., "A Mutlimedia System for Route Sharing and Video-based Navigation", IEEE, 2006, pp. 73-76.
Yanyan et al., "The model of optimum route selection in vehicle automatic navigation system based on unblocked reliability analyses", IEEE 2003.
Weiss et al., "Zone services—an approach for location-based data collection", Proceedings of the 8th International Conference on E-commerce Technology and the 3rd IEEE International Conference on Enterprise Computing, E-Commerce and E-Services, 2006; 8 pages.
Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.
Budka et al., "A Bayesian method to Improve Mobile Geolocation Accuracy", IEEE, 2002, pp. 1021-1025.
Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.
Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.
Challe, "CARMINAT-An Integrated information and guidance system," Vehicle Navigation and Information Systems Conference, Oct. 20-23, 1991, Renault—Direction de la Recherche, Rueil-Malmaison, France.
Pungel, "Traffic control-beat the jam electronically," Funkschau, 1988, 18:43-45 (w/English translation).
Rillings and Betsold, "Advanced driver information systems," Vehicular Technology, IEEE Vehicular Technology Society, 1991, 40:31-40.
Tsuzawa and Okamoto, "Advanced Mobile Traffic Information and Communication System," First Vehicle Navigation and Information Systems Conference, Sep. 11-13, 1989, Toronto, Canada, Abstract only.
Wong, "GPS: making roads safer and solving traffic tangles," Asia Engineer, 1995, 23(9):31-32.
"Sprite Terminator User Guide," [online] Dec. 6, 2007 (Dec. 6, 2007), pp. 1-45, Retrieved from the Internet: URL: http://www.spritesoftware.com/getmedia/4d2lad24-fd62-4c5e-a4fe-15ebc99aac9a/SpriteTerminator.aspx> [retrieved on Jul. 9, 2010].
Ayatsuka et al., "UbiquitousLinks: Hypermedia Links Embedded in the Real World, Technical Report of Information Processing Society, 96-HI-67," Information Processing Society of Japan, Jul. 11, 1996, 96(62):23-30.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Benefon ESC! GSM+GPS Personal Navigation Phone, benefon.com, Copyright 2001, 4 pages.
Freundschuh, "Does 'Anybody' Really Want (or Need) Vehicle Navigation Aids?" First Vehicle Navigation and Information System Conference, Sep. 11-13, 1989, Toronto, Canada, 5 pages.
Gould, "The Provision of Usable Navigation Assistance: Considering Individual Cognitive Ability," First Vehicle Navigation and Information System Conference, Sep. 11-13, 1989, Toronto, Canada, 7 pages.
Mark, "A Conceptual Model for Vehicle Navigation Systems," First Vehicle Navigation and Information System Conference, Sep. 11-13, 1989, Toronto, Canada, 11 pages.
Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.
Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.
Hoogenraad, "Location Dependent Services," 3rd AGILE Conference on Geographic Information Science, Helsinki/Espoo, Finland, May 25-27, 2000, pp. 74-77.
Bonsignore, "A Comparative Evaluation of the Benefits of Advanced Traveler Information System (ATIS) Operational Tests," MIT Masters Thesis, Feb. 1994, 140 pages.
Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.
Burnett, "Usable Vehicle Navigation Systems: Are We There Yet?" Vehicle Electronic Systems 2000, Jun. 29-30, 2000, 3.1.1-3.1.12.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.
Mahmassani et al., "Providing Advanced and Real-Time Travel/Traffic Information to Tourists," Center for Transportation Research, Bureau of Engineering Research, the University of Texas at Austin, Oct. 1998, 15 pages.
"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.
"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.
Green et al., "Suggested Human Factors Design Guidelines for Driver Information Systems," Technical Report UMTRI-93-21, Nov. 1993, 119 pages.
Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.
Muraskin, "Two-Minute Warnings for School Bus Riders," Internet: URL: http://www.callcentermagazine.com/shared/printableArticle.jhtml;jsessionid=PQH1SZXW . . . Jul. 1, 1999, 3 pages.
Ni and Deakin, "On-Board Advanced Traveler Information Systems," Dec. 1, 2002, 10 pages.
Serafin et al., "Functions and Features of Future Driver Information Systems," Technical Report UMTRI-91-16, May 1991, 104 pages.
Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.

(56) References Cited

OTHER PUBLICATIONS

"LaBarge in joint venture on bus system," Internet: URL: http://www.bizjournals.com/stlouis/stories/1998/08/10/focus2.html?t-printable, Aug. 7, 1998, 1 page.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
Zubac and Strahonja, "Theory and Development of an Online Navigation System," 18th International Conference on Information and Intelligent Systems, University of Zagreb, Sep. 12-14, 2007.
Brown, "The stick-e document: a framework for creating context-aware applications," Electronic Publishing, 1995, 8:259-272.
Brown, "Triggering Information by Context," Personal Technologies, 1998, 2:18-27.
Dey et al., "CyberDesk: a framework for providing self-integrating context-aware services," Knowledge-Based Systems, 1998, 11:3-13.
Hodes and Katz, "Composable ad hoc location-based services for heterogeneous mobile clients," Wireless Networks, 1999, 5:411-427.
Kreller et al., "A Mobile-Aware City Guide Application," ACTS Mobile Communication Summit, 1998, Rhodes, Greece, 7 pages.
Lusky et al., "Mapping the Present," ColoradoBiz, Nov. 1999, 26(11):16-17.
McCarthy and Meidel, "ACTIVEMAP: A Visualization Tool for Location Awareness to Support Informal Interactions," HUC '99, LNCS 1707, 1999, pp. 158-170.
O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.
Pascoe et al., "Developing Personal Technology for the Field," Personal Technologies, 1998, 2:28-36.
Tarumi et al., "Public Applications of SpaceTag and Their Impacts," Digital Cities, LNCS 1765, 2000, pp. 350-363.
Tebbutt, "Dial your way out of the woods," The Australian, Feb. 2000, 1 page.
Tso et al., "Always on, Always Connected Mobile Computing," Mobile Communications Operation—Mobile Handheld Products Group, 1996, pp. 918-924.
Wang and Lin, "Location Aware Information Agent over WAP," Tamkang Journal of Science and Engineering, 2000, 3(2):107-115.
"3rd Generation Partnership Project (3GPP); Technical Specification Group (TSP) RAN; Working Group 2 (WG2); Report on Location Services (LCS),"3G TR 25.923 v.1.0.0. Apr. 1999, 45 pages.
"Report on Location Service feature (LCS) 25.923 v1.0.0," TSG-RAN Working Group 2 (Radio layer 2 and Radio layer 3), Berlin, May 25-28, 1999, 45 pages.
"3rd Generation Partnership Project; Technical Specification Group Services and System Aspects; Functional stage 2 description of location services in UMTS," 3G TS 23.171 v.1.1.0, Nov. 1999, 42 pages.
"3rd Generation Partnership Project; Technical Specification Group Radio Access Network; Stage 2 Functional Specification of Location Services in UTRAN," 3G TS 25.305 v.3.1.0, Mar. 2000, 45 pages.
"Enabling UMTS / Third Generation Services and Applications," No. 11 Report from the UMTS Forum, Oct. 2000, 72 pages.
"3rd Generation Partnership Project (3GPP); Technical Specification Group (TSG) RAN; Working Group 2 (WG2); Report on Location Services," TS RAN R2.03 V0.1.0, Apr. 1999, 43 pages.
"Revised CR to Sep. 31 on work item LCS," ETSI SMG3 Plenary Meeting #6, Nice, France, Dec. 13-15, 1999. 18 pages.
Digital cellular telecommunications system (Phase 2+); Location Services (LCS); Service description, Stage 1 (GSM 02.71) ETSI, Apr. 1999, 22 pages.
Akerblom, "Tracking Mobile Phones in Urban Areas," Goteborg University Thesis, Sep. 2000, 67 pages.
Borsodi, "Super Resolution of Discrete Arrivals in a Cellular Geolocation System," University of Calgary Thesis, Apr. 2000, 164 pages.

Abowd et al., "Context-awareness in wearable and ubiquitous computing," 1st International Symposium on Wearable Computers, Oct. 13-14, 1997, Cambridge, MA, 9 pages.
Balsiger et al., "MOGID: Mobile Geo-depended Information on Demand," Workshop on Position Dependent Information Services (W3C-WAP), 2000, 8 pages.
Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.
Cheverst et al., "The Role of Connectivity in Supporting Context-Sensitive Applications," HUC'99, LNCS 1707, 1999, pp. 193-209.
Efstratiou and Cheverst, "Reflection: A Solution for Highly Adaptive Mobile Systems," 2000 Workshop on Reflective Middleware, 2000, 2 pages.
Cheverst et al., "The Support of Mobile-Awareness in Collaborative Groupware," Personal Technologies, 1999, 3:33-42.
Cheverst et al., "Design of an Object Model for a Context Sensitive Tourist Guide," Computers and Graphics, 1999, 23(6):883-891.
Cheverst et al., "Developing Interfaces for Collaborative Mobile Systems," 1999, 15 pages.
Cheverst et al., "Experiences of Developing and Deploying a Context-Aware Tourist Guide: The GUIDE Project," 2000, pp. 20-31.
Cheverst et al., "Exploiting Context to Support Social Awareness and Social Navigation," SIGGROUP Bulleting Dec. 2000, 21(3):43-48.
Cheverst et al., "Services to Support Consistency in Mobile Collaborative Applications," Proc. 3rd International Workshop on Services in Distributed Networked Environments, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," Workshop on Handheld CSCW, 1998, 6 pages.
Change Request for "U.S. specific Emergency Services requirements included as an informative annex," Nov. 29, 1999, 2 pages.
Costa et al., "Experiments with Reflective Middleware," Proceedings of the ECOOP'98 Workshop on Reflective Object-Oriented Programming and Systems, ECOOP'98 Workshop Reader, 1998, 13 pages.
Davies et al., "L2imbo: A distributed systems platform for mobile computing," Mobile Networks and Applications, 1998, 3:143-156.
Davies et al., "'Caches in the Air': Disseminating Tourist Information in the Guide System," Second IEEE Workshop on Mobile Computer Systems and Applications, Feb. 25-26, 1999, 9 pages.
Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.
Drane et al., "Positioning GSM Telephones," IEEE Communications Magazine, Apr. 1998, pp. 46-59.
Drane and Rizos, "Role of Positioning Systems in ITS," Positioning Systems in Intelligent Transportation Systems, Dec. 1997, pp. 312, 346-349.
Efstratiou et al., "Architectural Requirements for the Effective Support of Adaptive Mobile Applications," 2000, 12 pages.
"Estonian operator to launch world's first Network-based location services," Ericsson Press Release, Oct. 11, 1999, 2 pages.
Fischer et al., "System Performance Evaluation of Mobile Positioning Methods," IEEE, Aug. 2002, pp. 1962-1966.
Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.
French and Driscoll, "Location Technologies for ITS Emergency Notification and E911," Proc. 1996 National Technical Meeting of the Institute of Navigation, Jan. 22-24, 1996, pp. 355-359.
Friday et al., "Developing Adaptive Applications: The MOST Experience," J. Integrated Computer-Aided Engineering, 1999, pp. 143-157.
Gunnarsson et al., "Location Trial System for Mobile Phones," IEEE, 1998, pp. 2211-2216.
Jose and Davies, "Scalable and Flexible Location-Based Services for Ubiquitous Information Access," HUC'99, LNCS 1707, 1999, pp. 52-66.

(56) References Cited

OTHER PUBLICATIONS

Klinec and Nolz, "Nexus-Positioning and Communication Environment for Spatially Aware Applications," IAPRS, Amsterdam, 2000, 7 pages.
Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.
Kreller et al., "UMTS: A Middleware Architecture and Mobile API/Approach," IEEE Personal Communications, Apr. 1998, pp. 32-38.
Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.
Kyriazakos et al., "Optimization of the Handover Algorithm based on the Position of the Mobile Terminals," Communications and Vehicular Technology, Oct. 2000, pp. 155-159.
Leonhardt and Magee, "Multi-Sensor Location Tracking," MOBICOM 98, Dallas, TX, pp. 203-214.
Leonhardt and Magee, "Towards a general location service for mobile environments," Proc. Third International Workshop on Services in Distributed and Networked Environments, Jun. 3-4, 1996, 8 pages.
Long et al., "Rapid Prototyping of Mobile Context-Aware Applications: The Cyberguide Case Study," MobiCom '96, 1996, 11 pages.
Yokote, "The Apertos Reflective Operating System: The Concept and Its Implementation," OOPSLA'92, pp. 414-434.
Popescu-Zeletin et al., "Applying Location-Aware Computing for Electronic Commerce: Mobile Guide," Proc. 5th Conference on Computer Communications, AFRICOM-CCDC'98,Oct. 20-22, 1998, 14 pages.
Zhao, "Mobile Phone Location Determination and Its Impact on Intelligent Transportation Systems," IEEE Transactions on Intelligent Transportation Systems, Mar. 2000, 1(1):55-64.
Examiner E de la Rosa Rivera, European Search Report in EP 12 15 4027 mailed Apr. 10, 2012, 7 pages.
Examiner E de la Rosa Rivera, European Search Report in EP 12 15 4026 mailed Apr. 10, 2012, 5 pages.
Examiner E de la Rosa Rivera, European Search Report in EP 12 15 4025 mailed Apr. 12, 2012, 7 pages.
Examiner E de la Rosa Rivera, European Search Report in EP 12 15 4024 mailed Apr. 10, 2012, 6 pages.
US 6,731,928, 05/2004, Tanaka (withdrawn)

\* cited by examiner

INTEGRATION OF MAP SERVICES WITH USER APPLICATIONS IN A MOBILE DEVICE

CROSS-REFERENCE TO RELATED APPLICATIONS

This application claims priority to U.S. Provisional Patent Application Ser. No. 60/946,915 filed Jun. 28, 2007, and entitled "Integration of User Applications in a Mobile Device," the contents of which are incorporated herein by reference.

TECHNICAL FIELD

This invention generally relates to mobile devices.

BACKGROUND

Conventional mobile devices are often dedicated to performing a specific application. For example, a mobile phone provides telephony services; a personal digital assistant (PDA) provides a way to organize address, contacts and notes; a media player plays content; email devices provide email communication, etc. Modern mobile devices can include two or more of these applications. Typically, the two or more applications operate independent of one another, and the device functions as a combination of two or more of the devices described above.

SUMMARY

This invention relates to mobile devices. In general, in one aspect, the invention features a method including (optionally) receiving at a mobile device an email message from an email address and displaying a representation of the email message on a graphical user interface. An input is received from a user indicating a selection of the email address. Contact information corresponding to a set of contacts is searched for a contact having a contact email address matching the email address. Contact information for the contact includes a geographic location for the contact. A display of a map is provided to the user. The display includes a graphical representation indicating the geographic location for the contact having a contact email address matching the email address.

Implementations of the invention can include one or more of the following features. The mobile device can include a multi-touch-sensitive display, and receiving input from a user indicating a selection of the email address can be the user touching the email address on the multi-touch-sensitive display. A current location of the mobile device can be determined, and route information can be provided to the user corresponding to a route from the current location to the geographic location of the contact. The route information can include a graphical display of the route superimposed on the map; textual, directions for the route; and/or audio directions for the route. Providing route information can include providing the geographic location of the contact and the current location of the mobile device to a route service with a request for a route therebetween, and receiving the route information in response to the request. Providing a display of a map can include providing the geographic location of the contact to a map service, with a request for a map including the geographic location and receiving the map in response to the request.

In general, in another aspect, the invention features a method including activating a first user application on a mobile device, such that a user can make a request to a directory service for a telephone number. In response to the request, a short message including the telephone number is received. A geographic location is determined associated with the telephone number. A display is provided on a graphical user interface of a map including a graphical representation indicating the geographic location.

Implementations can include one or more of the following features. In one example, the first user application is a telephony application and the user request is a telephone call. In another example, the first user application is a short messaging service application and the user request is a short message. The short message received in response to the request can include the geographic location and determining a geographic location can include obtaining the geographic location from the short message. In another example, determining a geographic location associated with the telephone number includes sending a request to a service for providing a geographic location associated with a telephone number, and receiving the geographic location in response to the request.

A current location of the mobile device can be determined, and route information can be provided to the user corresponding to a route from the current location to the geographic location associated with the telephone number. The route information can include a graphical display of the route superimposed on the map; textual directions for the route and/or audio directions for the route. Providing route information can include providing the geographic location of the contact and the current location of the mobile device to a route service with a request for a route therebetween, and receiving the route information in response to the request. Providing a display of a map can include providing the geographic location of the contact to a map service with a request for a map including the geographic location, and receiving the map in response to the request.

In general, in another aspect, the invention features a system including an email application operable to receive an email message from an email address and a data structure including contact information for a set of contacts. The system further includes a processor configurable for receiving user input selecting the email address and, in response to the user input, searching the data structure for a contact having a contact email address matching the email address. The contact has an associated geographic location. The system further includes a map application and a display. The map application is operable to provide a display of a map. The map includes a graphical representation of the geographic location associated with the contact. The display is operable to display the map.

Implementations of the invention can include the following feature. The system can further include a positioning system operable to obtain a current location of a mobile device, and an engine operable to provide a graphical display on the map of a route from the current location to the geographic location associated with the contact.

In general, in another aspect, the invention features a system including a telephony application operable to receive user input calling a telephone directory and requesting a telephone number, and a short messaging service application operable to receive a short message including the telephone number in response to the request for a telephone number. The system further includes a communication system configurable for sending the telephone number to a navigation service, and for receiving from the navigation service a geographic location associated with the telephone number. The system further includes a map application and a display. The map application is operable to provide a display of a map, the map including a graphical representation of the geographic location associated with the telephone number. The display is operable to display the map.

Implementations of the invention can include the following additional feature. The system can further include a positioning system operable to obtain a current location of a mobile device, and an engine operable to provide a graphical display on the map of a route from the current location to the geographic location associated with the telephone number.

In general, in another aspect, the invention features a computer-readable medium having instructions stored thereon, which, when executed by a processor, cause the processor to perform operations including receiving at a mobile device an email message from an email address and displaying a representation of the email message on a graphical user interface. The operations further include receiving input from a user indicating a selection of the email address and searching contact information corresponding to a set of contacts for a contact having a contact email address matching the email address. The contact information for the contact includes a geographic location for the contact. The operations further include providing a display of a map to the user. The display includes a graphical representation indicating the geographic location for the contact having a contact email address matching the email address.

Implementations of the invention can include one or more of the following features. The mobile device can include a multi-touch-sensitive display and receiving input from a user indicating a selection of the email address can include the user touching the email address on the multi-touch-sensitive display. The operations can further include determining a current location of the mobile device, and providing route information to the user corresponding to a route from the current location to the geographic location of the contact.

In general, in another aspect, the invention features a system including a processor and a storage device. The storage device is coupled to the processor and configurable for storing instructions, which, when executed by the processor, cause the processor to perform operations including receiving at a mobile device an email message from an email address and displaying a representation of the email message on a graphical user interface. The operations further include receiving input from a user indicating a selection of the email address and searching contact information corresponding to a set of contacts for a contact having a contact email address matching the email address. The contact information for the contact includes a geographic location for the contact. The operations further include providing a display of a map to the user. The display includes a graphical representation indicating the geographic location for the contact having a contact email address matching the email address.

In general, in another aspect, the invention features a computer readable medium having instructions stored thereon, which, when executed by a processor, cause the processor to perform operations including activating a first user application on a mobile device, such that a user can make a request to a directory service for a telephone number. The operations further include, in response to the request, receiving a short message including the telephone number and determining a geographic location associated with the telephone number. The operations further include providing a display on a graphical user interface of a map including a graphical representation indicating the geographic location.

Implementations of the invention can include one or more of the following features. In one implementation, the first user application is a telephony application and the user request is by way of a telephone call. In another implementation, the first user application is a short messaging service application and the user request is by way of a short message. The operations can further include determining a current location of the mobile device and providing route information to the user corresponding to a route from the current location to the geographic location associated with the telephone number.

In general, in another aspect, the invention features a system including a processor and a storage device coupled to the processor and configurable for storing instructions, which, when executed by the processor, cause the processor to perform operations including activating a first user application on a mobile device, such that a user can make a request to a directory service for a telephone number. The operations further include, in response to the request, receiving a short message including the telephone number and determining a geographic location associated with the telephone number. The operations further include providing a display on a graphical user interface of a map including a graphical representation indicating the geographic location.

In general, in another aspect, the invention features a mobile device including a communication system, an input/output (I/O) system, a processor and a map application. The communication system is configurable for receiving a communication from an individual or entity, the communication including information associated with the individual or entity. The I/O system is coupled to the communication system and configurable for displaying a representation of the information on the mobile device, and for receiving input specifying at least a portion of the information. The processor is coupled to the I/O system and configurable for retrieving from a data structure of the mobile device a geographic location associated with the individual or entity. The communication system sends the geographic information to a navigation service, which service responds by sending map information including coordinates for the geographic location. The map application, which when executed by the processor, uses the map information to generate a map for display by the mobile device. The map includes a graphical representation of the coordinates for the geographic location.

In general, in another aspect, the invention features a mobile device including a communication system configurable for sending a communication from a user of the mobile device, the communication including a request for a telephone number, and for receiving a short message including the telephone number. The mobile device further includes an input/output (I/O) system coupled to the communication system and configurable for receiving input specifying the request. The mobile device further includes a processor coupled to the I/O system and configurable for determining a geographic location associated with the telephone number, wherein the communication system sends the geographic information to a navigation service, which service responds by sending map information including coordinates for the geographic location. A map application is included, which when executed by the processor, uses the map information to generate a map for display by the mobile device. The map includes a graphical representation of the coordinates for the geographic location.

Implementations of the invention can include one or more of the following features. The communication including a request for a telephone number can be a telephone call to a telephone directory service. In another example, the communication including a request for a telephone number can be a short message to a telephone directory service.

In general, in another aspect, the invention features, a method including receiving a request from a mobile device for map information and providing the map information to the mobile device. The request includes a geographic location that was derived by the mobile device from an associated email address and associated contact information included in an address book residing on the mobile device. The map information can be used by the mobile device to display a map including a graphical representation of the geographic location.

Implementations of the invention can include the following feature. The method can further include receiving a request for route information from the mobile device and providing the route information to the mobile device. The route is from a current location of the mobile device to the geographic location and the request includes the current location of the mobile device. The route information can be used by the mobile device to display a map including a graphical representation of the route.

In general, in another aspect, the invention features a system including a processor and a storage device coupled to the processor and configurable for storing instructions, which, when executed by the processor, cause the processor to perform operations including receiving a request from a mobile device for map information and providing the map information to the mobile device. The request includes a geographic location that was derived by the mobile device from an associated email address and associated contact information included in an address book residing on the mobile device. The map information can be used by the mobile device to display a map including a graphical representation of the geographic location.

Implementations of the invention can include the following feature. The instructions, when executed by the processor, further cause the processor to perform operations including receiving a request for route information from the mobile device for a route from a current location of the mobile device to the geographic location. The request includes the current location of the mobile device. The operations further include providing the route information to the mobile device, wherein the route information can be used by the mobile device to display a map including a graphical representation of the route.

In general, in another aspect, the invention features a method include receiving a request from a mobile device for map information and providing the map information to the mobile device. The request includes a geographic location that was derived by the mobile device from a short message including a telephone number received by the mobile device from a telephone directory service. The map information can be used by the mobile device to display a map including a graphical representation of the geographic location.

Implementations of the invention can include the following additional feature. A request for route information can be received from the mobile device for a route from a current location of the mobile device to the geographic location, the request including the current location of the mobile device. The route information can be provided to the mobile device, wherein the route information can be used by the mobile device to display a map including a graphical representation of the route.

In general, in another aspect, the invention features, a system including a processor and a storage device coupled to the processor and configurable for storing instructions, which, when executed by the processor, cause the processor to perform operations including receiving a request from a mobile device for map information and providing the map information to the mobile device. The request includes a geographic location that was derived by the mobile device from a short message including a telephone number received by the mobile device from a telephone directory service. The map information can be used by the mobile device to display a map including a graphical representation of the geographic location.

Implementations of the invention can include the following feature. The instructions, when executed by the processor, can further cause the processor to perform operations including receiving a request for route information from the mobile device and providing the route information to the mobile device. The route is from a current location of the mobile device to the geographic location. The request includes the current location of the mobile device. The route information can be used by the mobile device to display a map including a graphical representation of the route.

Implementations of the invention can realize one or more of the following advantages. Various different applications provided by a mobile device can be integrated to provide an enhanced user experience. A user can seamlessly use or obtain information provided by multiple applications by interaction with integrated features. The user can efficiently be provided with meaningful information, for example, map and routing information, with reduced effort from the user's perspective.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
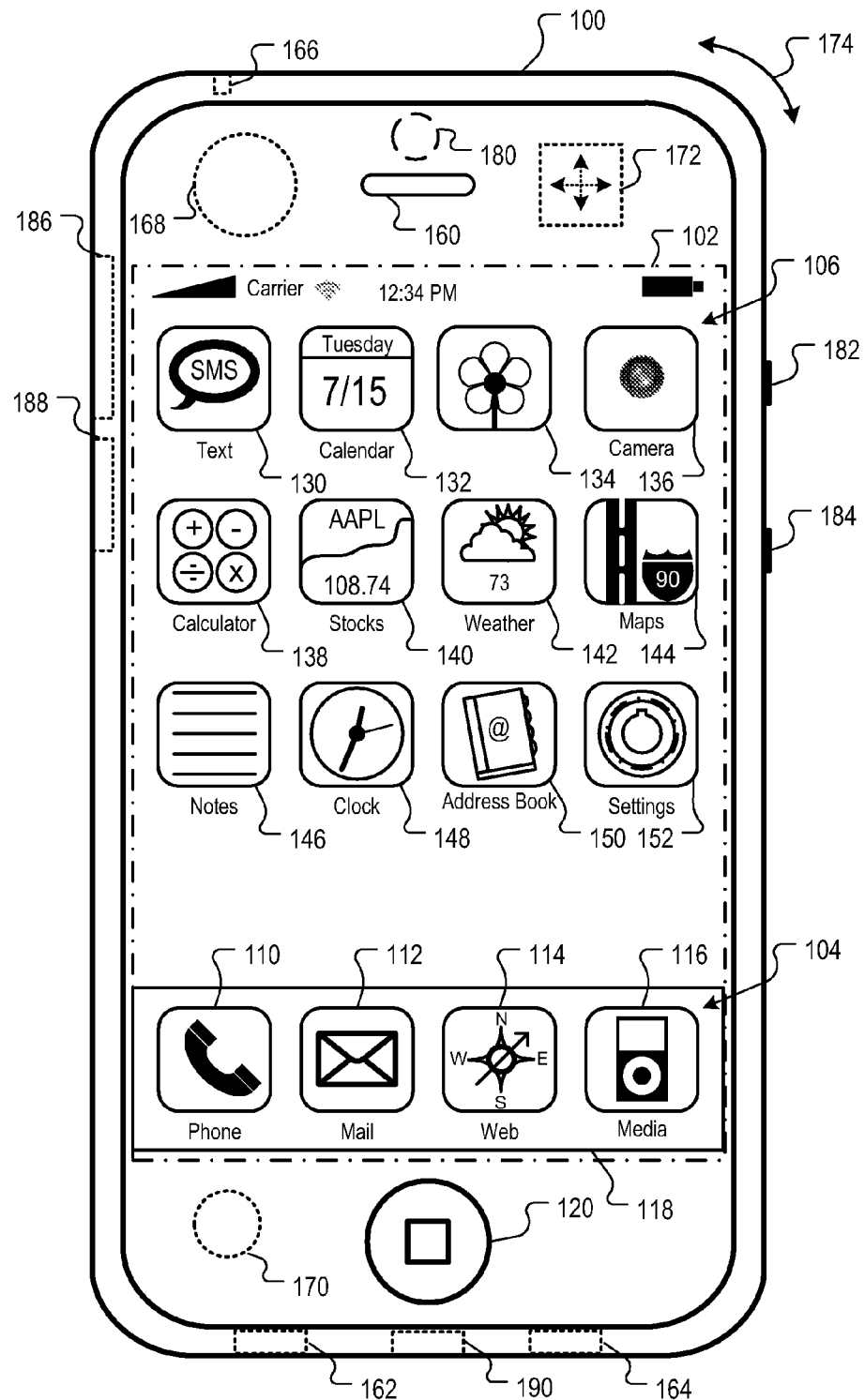
FIG. 1 is a block diagram of a mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which a point of contact is made using a stylus or other pointing device. An example of multi-touch sensitive display technology is described in U.S. Pat. Nos. 6,323,846; 6,570,557; 6,677,932; and U.S. Patent Publication No. 2002/0015024A1, each of which are incorporated by reference herein in its entirety.

In some implementations, the mobile device 100 can display one or more graphical user interfaces on the touch-sensitive display 102 for providing the user access to various system objects and for conveying information to the user to facilitate an intuitive user experience. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; and a media processing device, as indicated by the media player object 116. In some implementations, particular display objects 104, e.g., the phone object 110, the e-mail object 112, the Web object 114, and the media player object 116, can be displayed in a menu bar 118. In some implementations, each of the device functionalities can be accessed from a top-level graphical user interface, such as the graphical user interface illustrated in FIG. 1. Touching one of the objects 110, 112, 114 or 116 can, for example, invoke the corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., via Wi-Fi) to other wireless devices in the vicinity. For example, mobile device 100 can be configured as a base station for one or more devices. As such, mobile device 100 can grant or deny network access to other wireless devices.

In some implementations, upon invocation of particular device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various email functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 1 00. In some implementations, each corresponding device functionality may have corresponding "home" display objects displayed on the touch-sensitive display 102, and the graphical user interface environment of FIG. 1 can be restored by touching the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS). In some implementations, a positioning system (e.g., a GPS receiver) can be integrated into the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, a personal computer, a printer, or other processing devices capable of receiving and/or transmitting data.

In some implementations, a port device 190, e.g., a USB port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP over USB protocol described in co-pending U.S. Provisional Patent Application No. 60/945,904, filed Jun. 22, 2007, for "Multiplex Data Stream Protocol", Attorney Docket No. 004860.P5490, which patent application is incorporated by reference herein in its entirety.

Network Operating Environment

Figure 2:
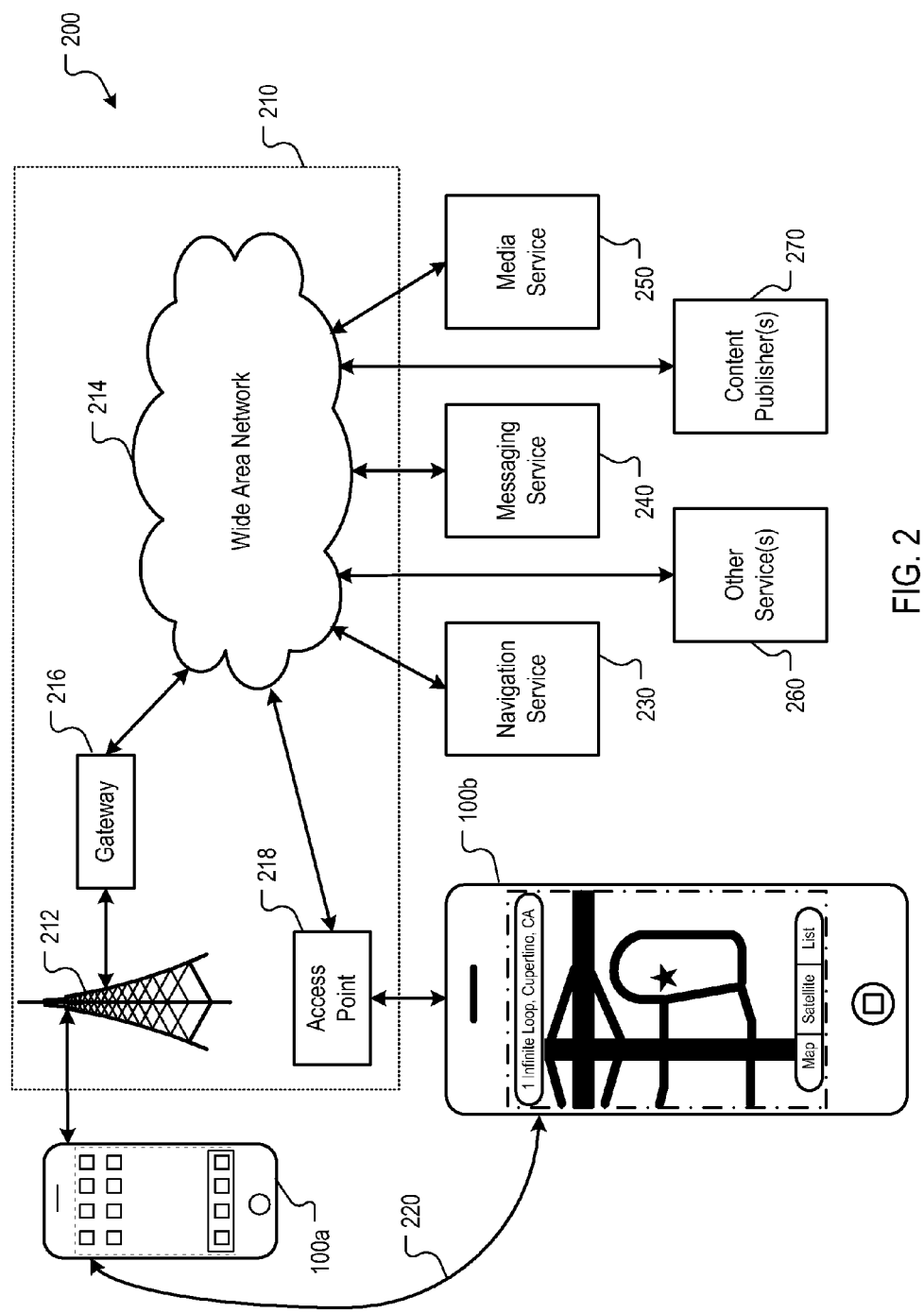
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250 and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100 (e.g., syncing services, software update services, activation services).

The mobile device 100 can also access other data and content over the one or more wired and/or wireless networks 210. For example, content publishers 270, such as news sites, RSS feeds, web sites, blogs, social networking sites, developer networks, etc. can be accessed by the mobile device 100. Such access can be provided by invocation of web browsing function or application (e.g., a browser) in response to a user touching the Web object 114.

Example Mobile Device Architecture

Figure 3:
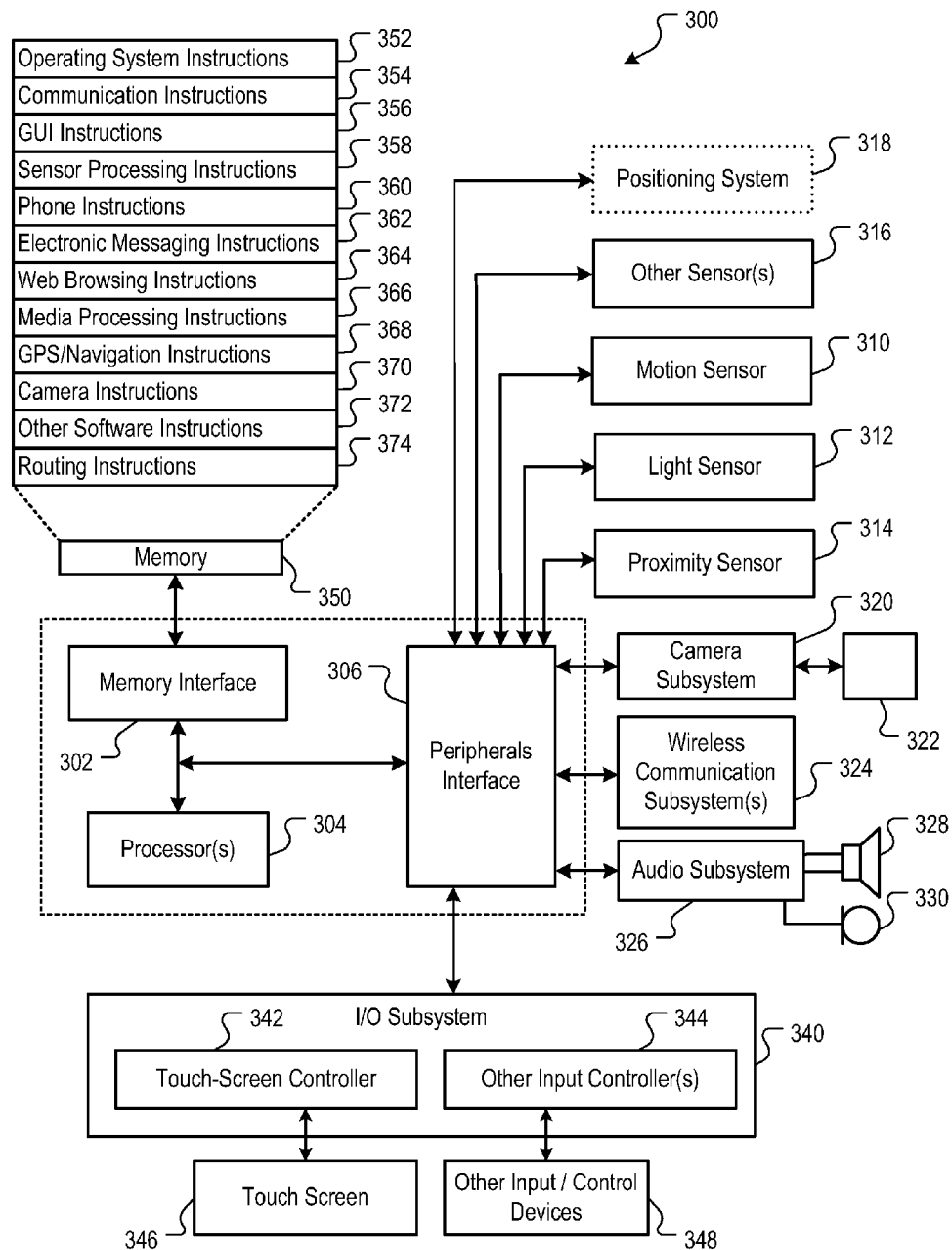
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302 one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., a GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 or data to facilitate other related processes and functions (e.g., security instructions, activation record).

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Integrated User Applications

A mobile device, e.g. mobile device 100 shown in FIG. 1, can provide multiple user applications, as discussed above. Two or more of the user applications can be integrated, to enhance the user's experience and provide improved functionality. Some examples of integrated user application features are described in further detail below.

Integrated Address Book/Email Feature

In one implementation, the mobile device 100 provides an address book application. The user of the mobile device can select the address book display object 150 to invoke the address book application. The address book includes information corresponding to a set of the user's contacts. For example, the contact information can include a person or entity's name, address, phone number, email address, and/or other information related to the person or entity. The address book can reside on the mobile device 100, or be stored externally but accessible by the mobile device 100. An integrated address book feature can be provided, wherein the address book application is integrated with one or more other applications provided by the mobile device.

In one implementation, the mobile device 100 also includes an email application. The email application can be accessed by a user interaction with a user interface. For example, referring again to FIG. 1, a user can select the email display object 112 to activate the email application. The email application and the address book application can be integrated, as described further below.

Figure 4:
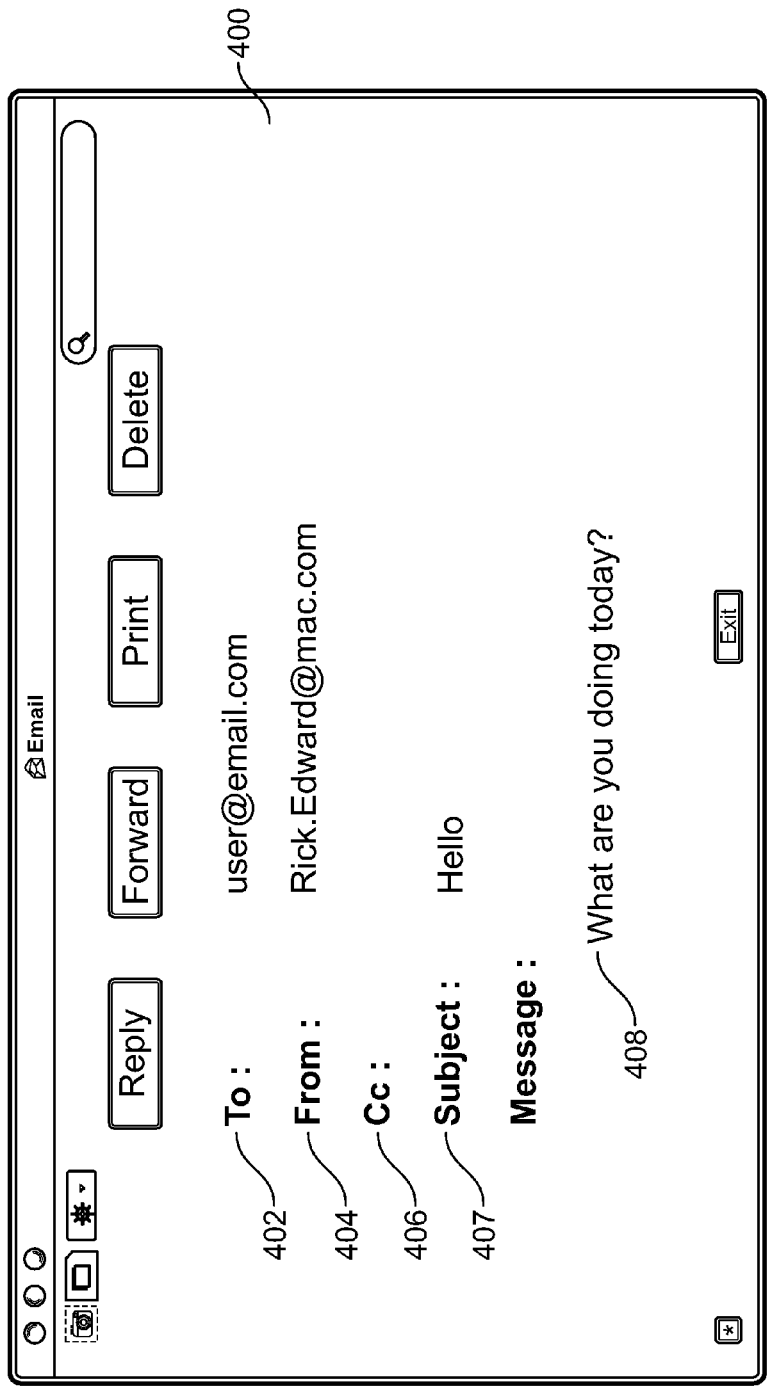
FIG. 4 is an example graphical user interface displaying an email message.

Referring to FIG. 4, an example graphical user interface is shown displaying an example email message 400. The email message 400 was received at the mobile device 100 and is displayed using the email application. The email message 400 includes a "to" field 402 indicating the email address to whom the email message 400 was sent, i. e., an email account of the user of the mobile device 100. The email message further includes a "from" field 404 indicating the email address of the sender of the email message 400. Optionally, an email message can include a "cc" field 406 indicating email addresses of others copied on the email message. The email message 400 includes a "subject" field 407, where the sender of the email message can optionally provide an indication of the subject matter of the email message. The email message 400 includes a text field 408, including the substance of the email message.

In this implementation, the user can interact with the email message 400 to select an email address in either the "from" or "cc" fields 404, 406. By way of example, if the mobile device 100 includes a touch-sensitive display, such as the touch-sensitive display 106 in FIG. 1, the user can select the email address by touching the email address on the display 106.

Figure 5:
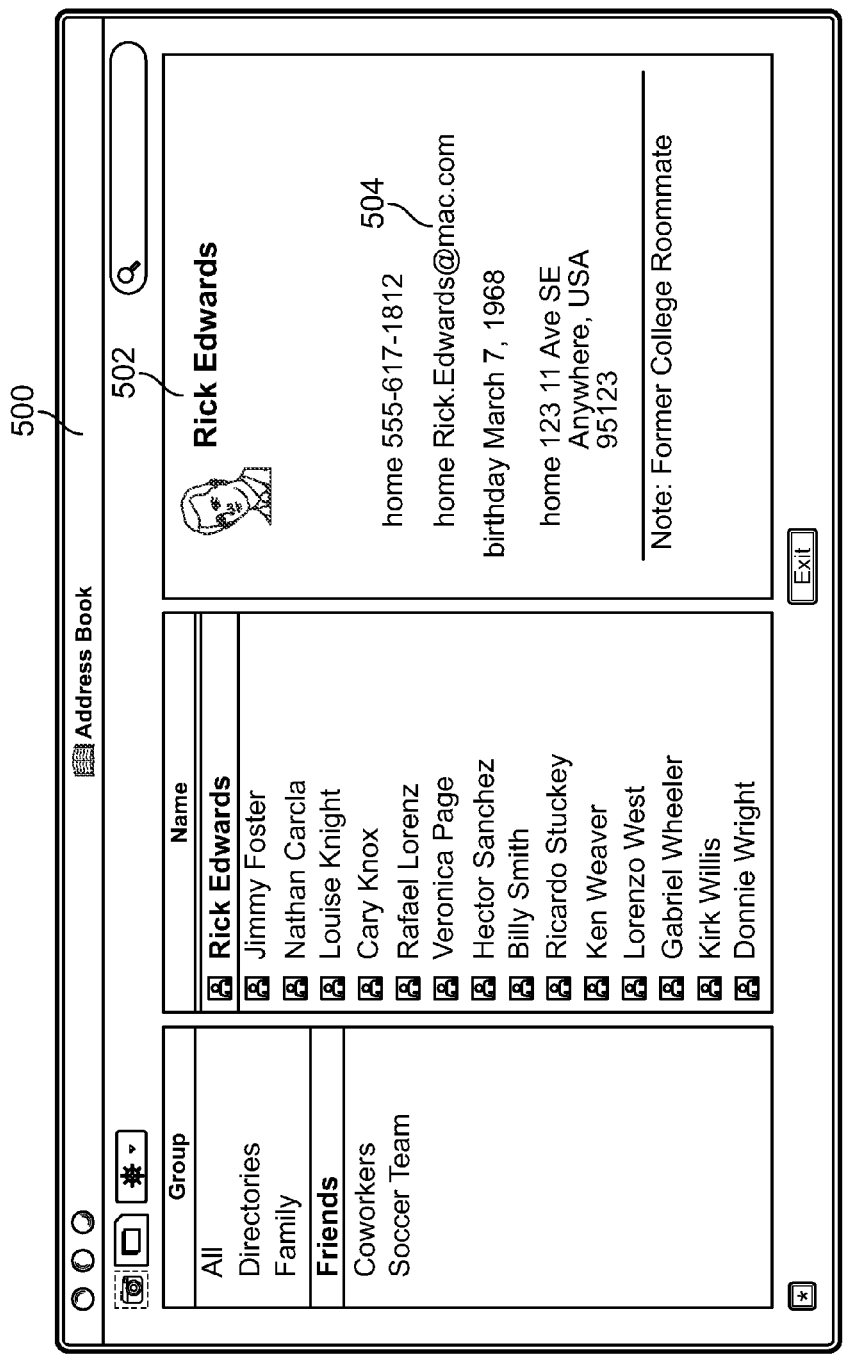
FIG. 5 is an example graphical user interface displaying contact information.

Upon selecting an email address, the address book is automatically searched to determine whether a contact is included in the address book with an email address matching the selected email address. In this example, the email message was sent from Rick.Edward@mac.com. The address book is searched for a contact having the same email address in the email address field of the contact information for the contact. Referring now to FIG. 5, an example page 500 from the address book is shown including contact information 502 for a contact identified as "Rick Edwards". The email address 504 for Rick Edwards matches the email address in the "from" field 404 of the email message 400 shown in FIG. 4.

Figure 6:
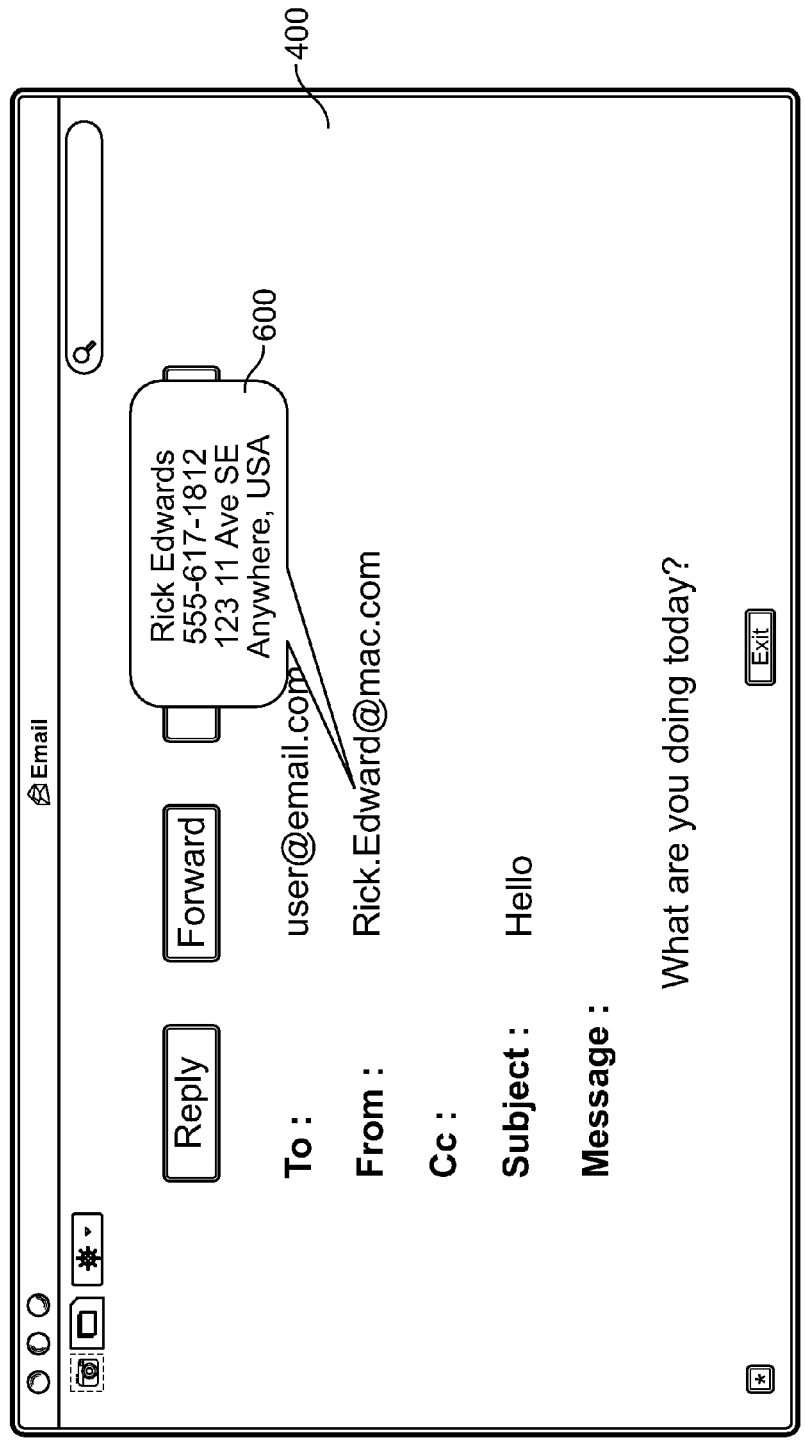
FIG. 6 is an example graphical user interface displaying an email message.

In one implementation, in response to the user selecting the email address in the "from" field 404 of the email message 400, if a matching contact is found, the display of the email message is replaced by a display of the page 500 from the address book including the corresponding contact information. In another implementation, both the email message 400 and the page 500 from the address book are displayed simultaneously using a split screen approach. In yet another implementation, at least some of the contact information is displayed superimposed on the email message, for example, within an information balloon 600 as shown in FIG. 6. Other techniques for conveying the contact information to the user are possible, and different configurations of graphical user interfaces can be used. The ones described herein are examples for illustrative purposes.

In one implementation, the user can use a first mode of selecting the email address to receive a first result and a second mode of selecting the email address to receive a second result. For example, in the case of a mobile device 100 with a touch-sensitive display 106, a first mode of selecting the email address can be the user briefly touching the email address. The first result displayed in response to the selection can be a display of the information balloon 600 superimposed on the email message 400, as shown in FIG. 6. A second mode of selecting the email address can be the user touching the email address for a sustained period of time (e.g., a few seconds). The second result displayed in response to the selection can be a display of the page 500 from the address book including the entire set of contact information for the contact corresponding to the email address, as shown in FIG. 5.

In another implementation, where a user can interact with the email message 400 using a mouse or other such pointer device to control a position of a cursor, a first mode of selecting the email address can be to hover the cursor over the email address being selected. A second mode of selecting the email address can be to click on the email address. Other manners of interacting with the email message 400 to select the email address are possible, and the ones described are examples.

Integrated Address Book/Email/Map Feature

Figure 7:
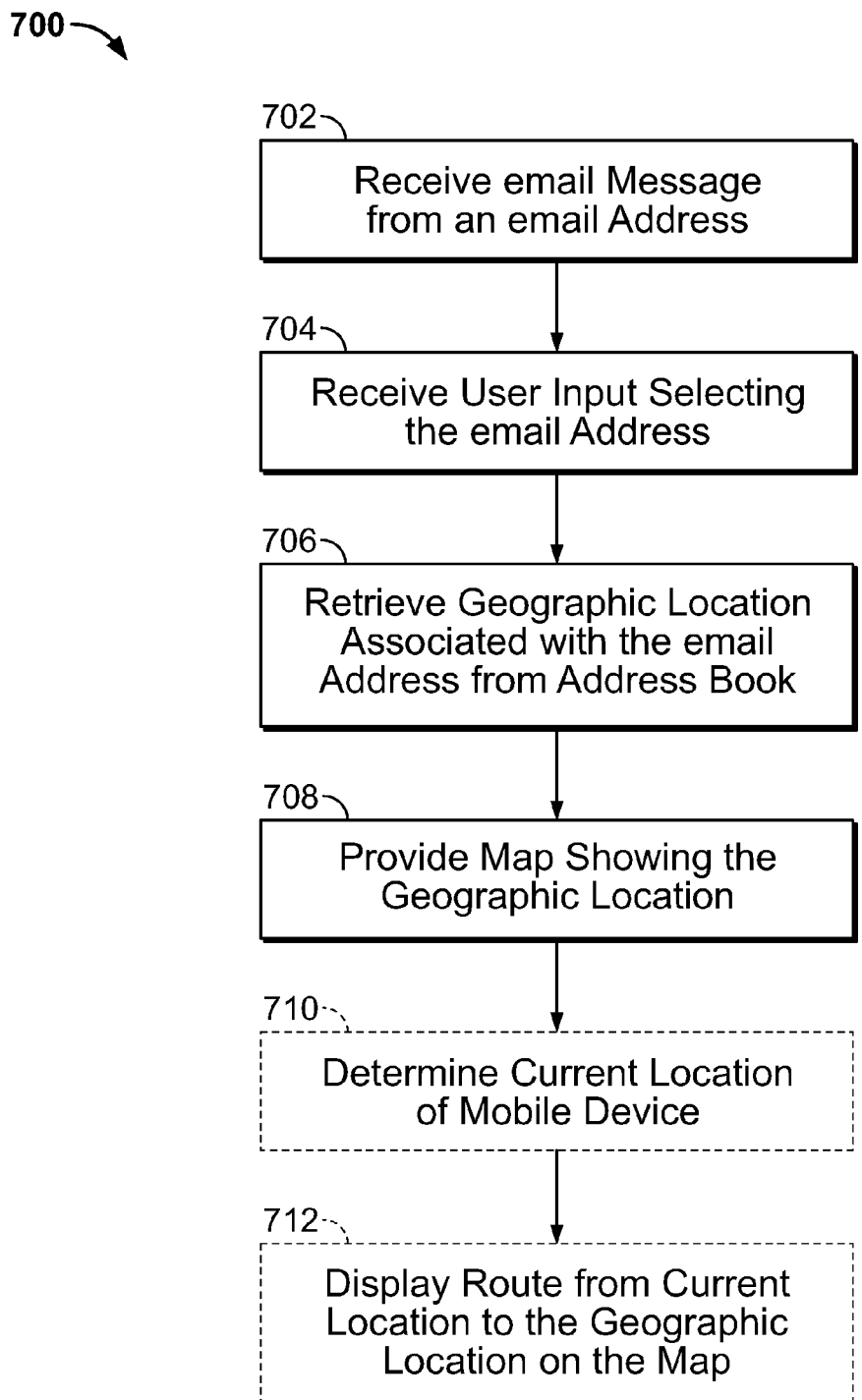
FIG. 7 is a flowchart showing an example process for providing an integrated email/addressbook/map feature.

In one implementation, upon a user selecting an email address in the email message 400, if a matching contact is located in the address book and the contact information for the contact includes an address for a geographic location, then a map is displayed to the user showing the geographic location. Referring to FIG. 7, a process 700 is shown for displaying a geographic location on a map to a user in response to selecting an email address within an email message. In step 702, an email message is received from an email address by an email application operating within a mobile device. By way of example, the email message 400 is received from the email address for Rick Edwards, 404. A user input is received selecting the email address (Step 704). Again, by way of example, the user can select the "from" field to select Rick Edwards' email address. It should be understood that steps 702 and 704 are optional and the process can commence at step 706.

A geographic location associated with the email address is retrieved from an address book application operated by the mobile device (Step 706). Referring to the above example, the geographic location associated with the email address for Rick Edwards as shown on a page 500 from the address book is 123 11 Ave SE, Anywhere, USA. An "address" field in the contact information 502 for the contact corresponding to the email address can be searched to retrieve the address. A map is provided on a user interface for display to the user, where the map shows the geographic location (Step 708). For example, referring to FIG. 8, the map 800 can be displayed with a graphical representation, i.e., the star 802, at the geographic location corresponding to 123 11 Ave SE, Anywhere, USA.

In one implementation, a map application is provided by the mobile device 100, either internally or by way of interfacing with an external map service. By way of example, the map service can be Google Maps API provided by Google, Inc. of Mountain View, Calif., although other map services can be used. A request for a map that is approximately centered about the geographic location can be sent to the map application and the map received from the map application. The map is displayed on a user interface, for example, the touch-sensitive user interface 106 shown on the mobile device 100 in FIG. 1.

Integrated Address Book/Email/Map/Route Feature

In one implementation, the mobile device 100 is location aware (i.e., can determine its current location). Referring again to FIG. 3, in this implementation, the mobile device 100 includes a positioning system 318. In various implementations, the positioning system 318 can be provided by a separate device coupled to the mobile device 100, or can be provided internal to the mobile device. In some implementations, the positioning system 318 can employ positioning technology including a GPS, a cellular grid, television signals, Wi-Fi base stations, URIs or any other technology for determining the geographic location of a device. In other implementations, the positioning system 318 can be provided by an accelerometer and a compass using dead reckoning techniques. In such implementations, the user can occasionally reset the positioning system by marking the mobile device's presence at a known location (e.g., a landmark or intersection). In other implementations, the positioning system 318 can be provided by using wireless signal strength and one or more locations of known wireless signal sources to provide the current location. Wireless signal sources can include access points and/or cellular towers. In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. Other techniques to determine a current location of the mobile device 100 can be used and other configurations of the positioning system 318 are possible.

Referring again to FIG. 7, in an optional step 710, the mobile device can determine its current location. The current location can be provided to an engine (e.g., embodied in routing instructions 374 included within the memory 350, see FIG. 3). The engine can be used to provide navigation guidance to a user of the mobile device 100. In such implementations, the engine can provide route information to the user from a current location of the mobile device 100 to the geographic location corresponding to a selected email address.

Referring again to FIG. 5, in an implementation where the mobile device is location aware, a proximity to an address included in the contact information. One example of a display of proximity information is shown at 506. The distance can represent a radial proximity, proximity by a closest-travel-route, or another measurement of proximity.

Figure 9:
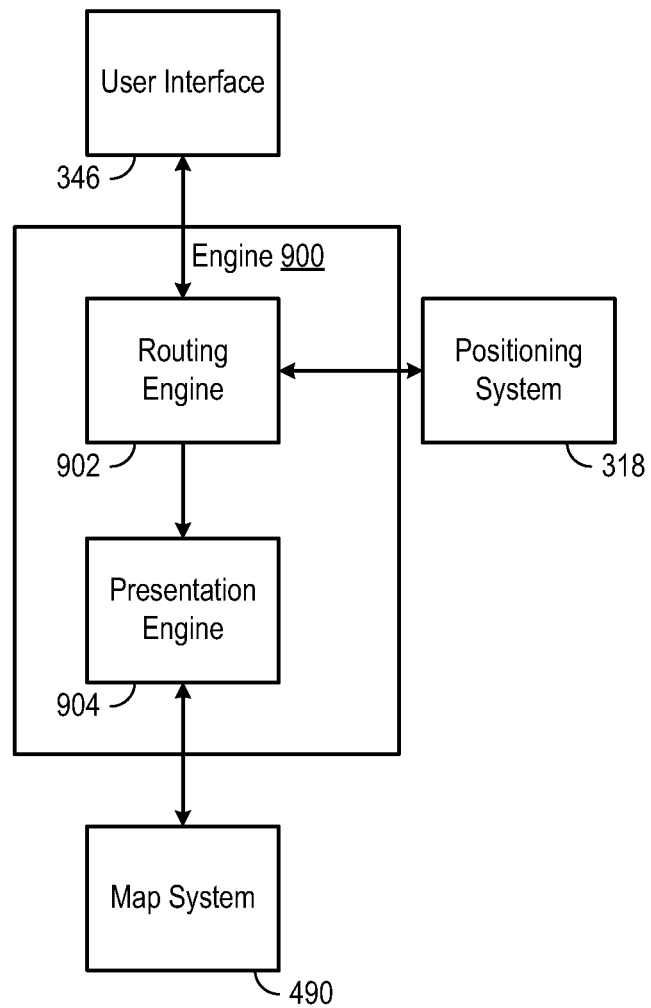
FIG. 9 is a block diagram representing an example engine.

FIG. 9 is a block diagram illustrating an example operation of the engine 900 (e.g., embodied in routing instructions 374). In some implementations, the engine 900 includes a routing engine 902 and a presentation engine 904. In one implementation, the routing engine 902 can derive a route between two locations, i.e., the current location and a contact location (i.e., a geographic location corresponding to a contact in the address book), using existing routing technology. By way of illustration, Google Maps API is one example of existing routing technology, available from Google, Inc. (Mt. View Calif.). The current location is determined using the positioning system 318, as described above. The contact location is determined from the contact information included in the address book corresponding to the selected email address.

Figure 8:
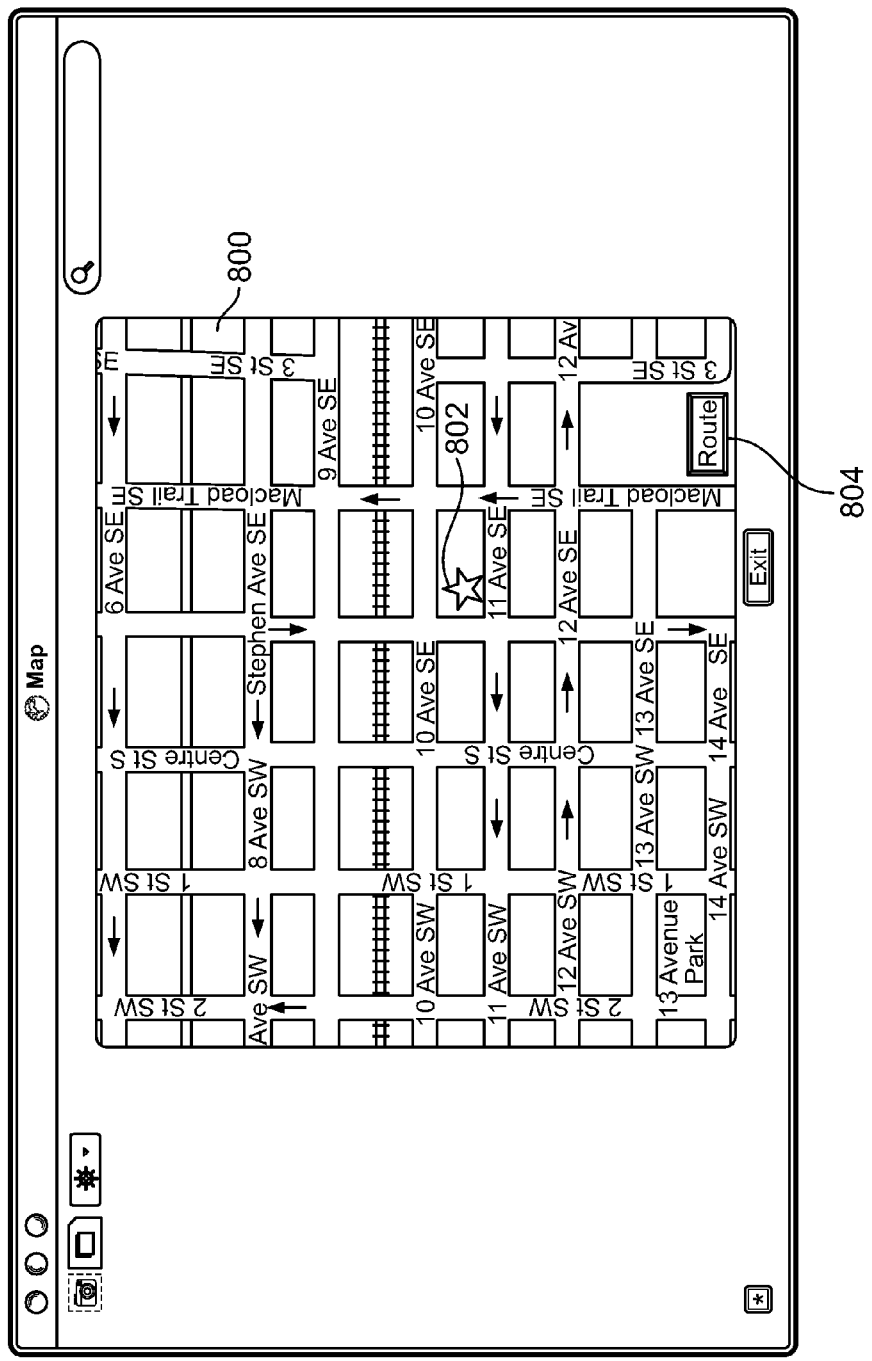
FIG. 8 is an example graphical user interface displaying a map.
Figure 10:
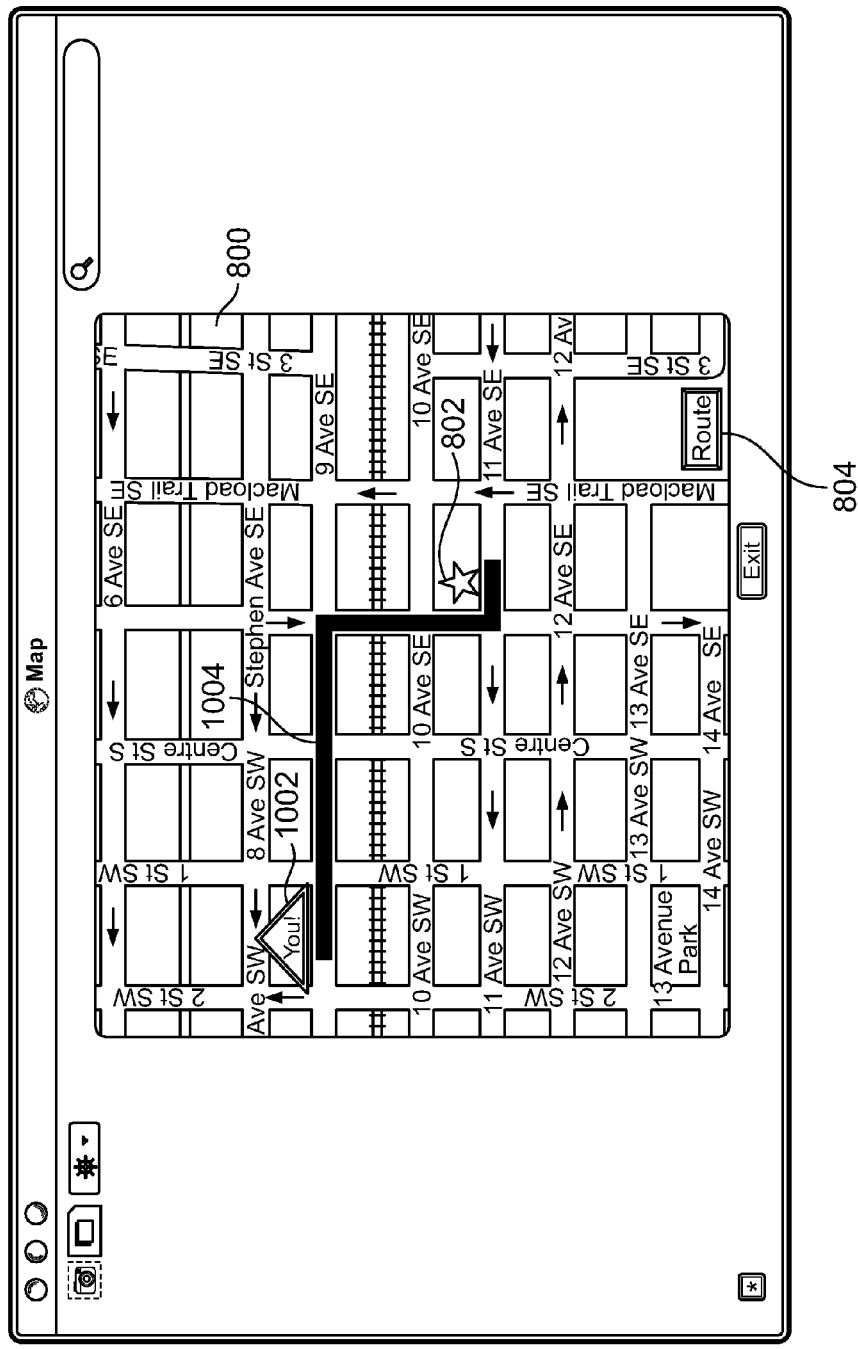
FIG. 10 is an example graphical user interface displaying a map and a route superimposed thereon.

The routing engine 902 provides a route from the current location to the contact location to the presentation engine 904. The presentation engine 904 can communicate with the map application used to implement the integrated address book feature. The presentation engine 904 can use a map provided by the map application 906 to overlay the route information. Referring to FIG. 10, the map 800 of FIG. 8 is shown with a route 1004 superimposed thereon. A graphical display object 1002 indicates the current location of the mobile device 100 and the graphical display object 802 indicates the contact location. In one implementation, as described above, the user can select a route display object 804 superimposed on the map 800 (or otherwise displayed to the user) to activate the route application.

In one implementation, the route information can include either in addition to the route displayed on the map, or instead of the route displayed on the map, an audio file including audio directions from the current location of the mobile device 100 to the contact location. The audio file can be delivered, for example, to a voicemail application provided by the mobile device. In one implementation, the audio file includes chapter marks such that the user can play back the voicemail while traveling the route to the contact location, and pause at the chapter marks while progressing along the route from one instruction to the next. In another implementation, the audio file is included in a podcast delivered to the mobile device 100 over the Internet. The audio file included in the podcast may also include chapter marks to facilitate playback of the route information while progressing along the route. In an implementation where the audio file is provided in conjunction with the route displayed on a map, the mobile device's current location as the mobile device progresses along the route can be tracked on the map in sync with the directions being provided by audio to the user.

Integrated Telephony/Short Messaging Service/Map/Route Application

Figure 11:
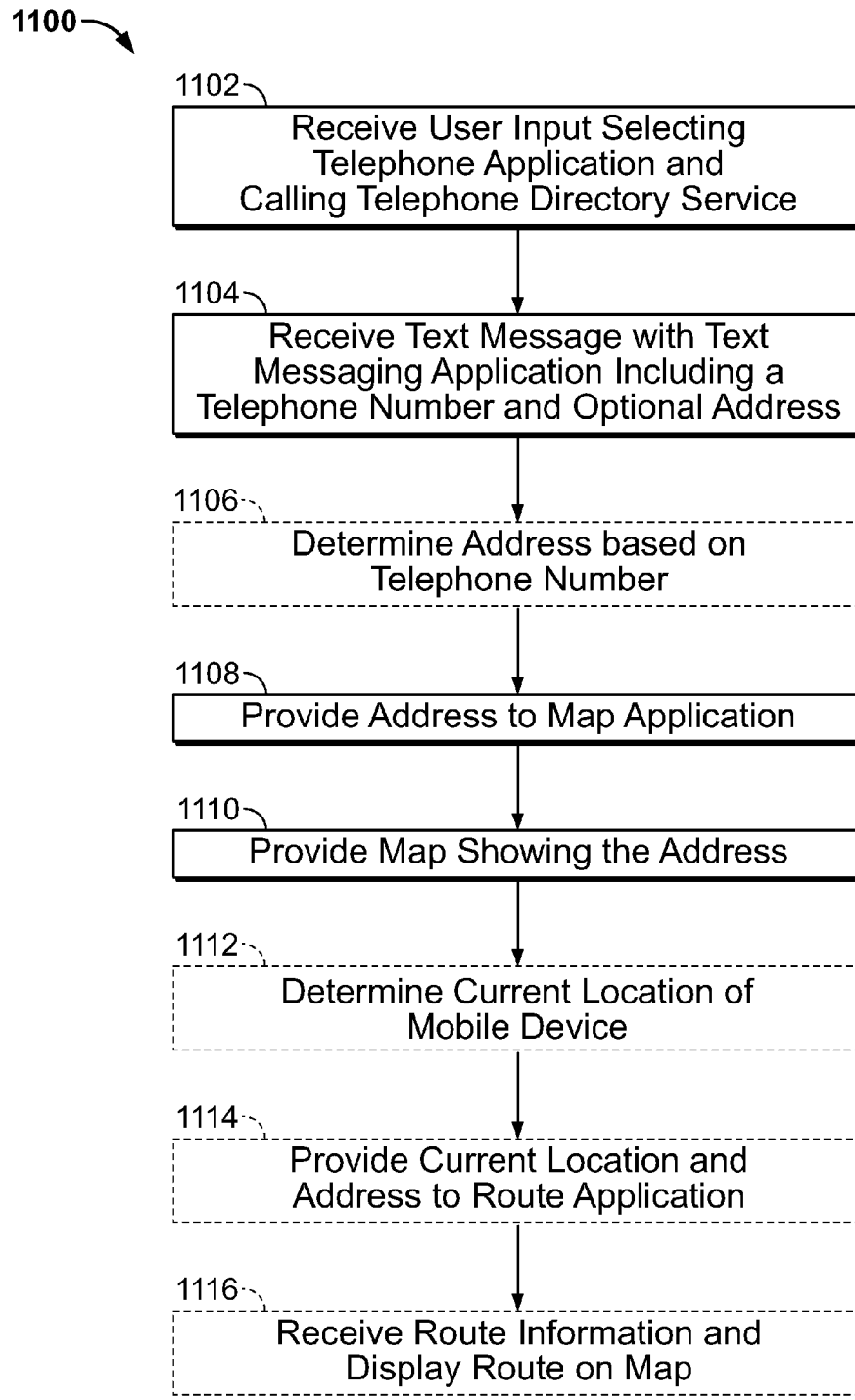
FIG. 11 is a flowchart showing an example process for providing an integrated telephony/short messaging service/map feature.

In another implementation, a telephony application, short messaging service application, map application and optionally, a route application, can be integrated into an integrated user feature. Referring to FIG. 11, an example process 1100 wherein a user employs the integrated user feature is shown. In a first step 1102, the mobile device receives user input selecting and using the telephony application to call a telephone directory service. For example, the user can telephone a "411" or similar type of information number. The user can select to have the telephone number and/or address information provided by the telephone directory service delivered to the mobile device by way of a short message. By way of illustrative example, certain mobile service providers enable text messaging delivery of telephone directory information to their mobile telephone customers. The short message is received by a short messaging service application provided by the mobile device, wherein the short message includes a telephone number and optionally a corresponding address (Step 1104).

If the short message includes an address, then the address can be sent to the map application with a request for a map showing the address. If the short message only includes a telephone number, a corresponding address can be determined based on the telephone number (Optional Step 1106), for example, using a reverse look-up service. By way of illustration, a reverse lookup service is provided by www.reversetelephonedirectory.com, wherein a telephone number can be provided to obtain a corresponding address. This service, or a similar service, can be employed to receive the telephone number provided by the mobile device and to send as a response the corresponding address.

In either case, the address is provided to the map application (Step 1108). The map application provides a map showing the address (Step 1110). For example, the map can be the map 800 sown in FIG. 8, where the star 802 represents the address.

Figure 12:
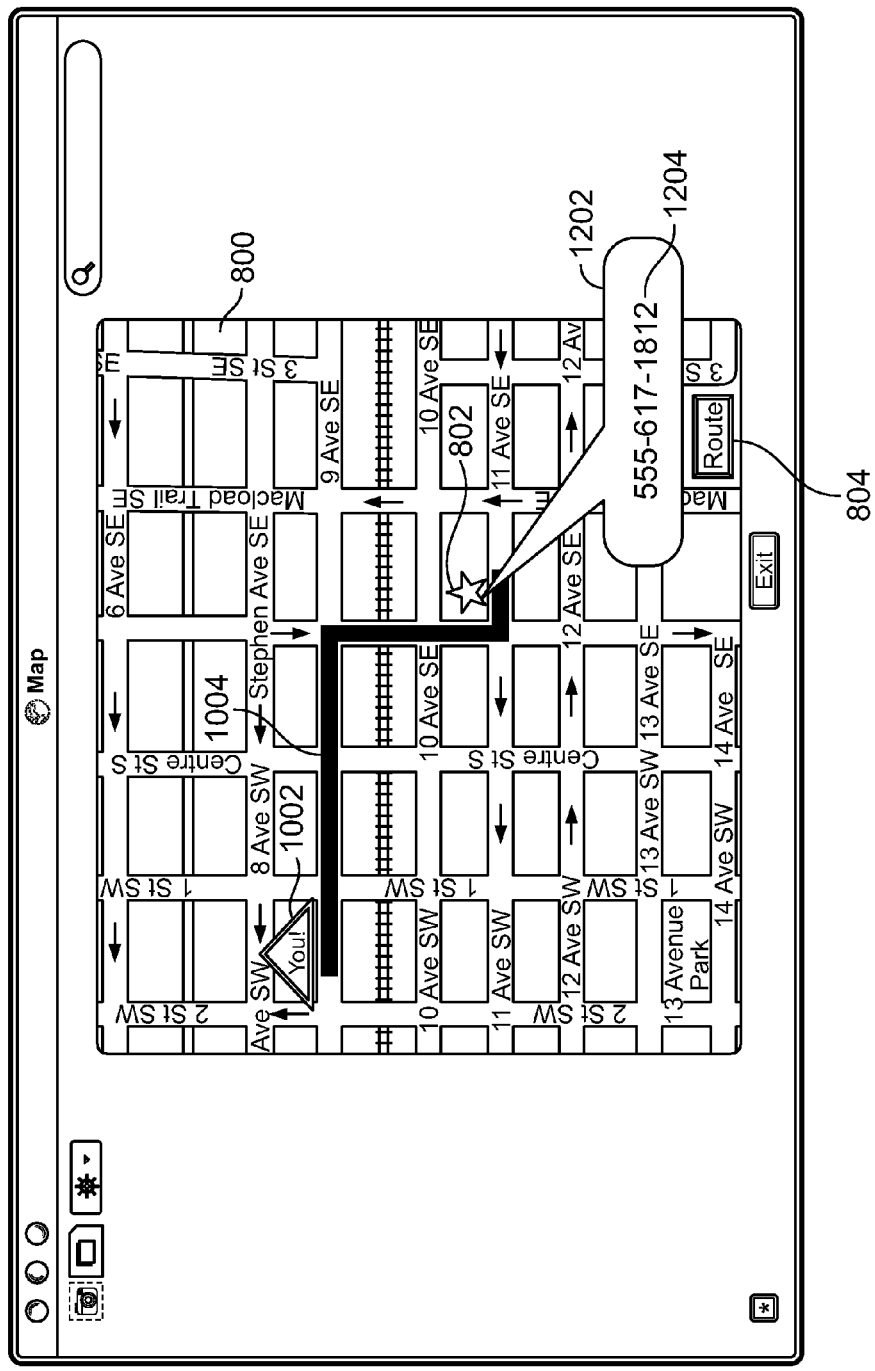
FIG. 12 is an example graphical user interface displaying a map and a route and contact information superimposed thereon.

In one implementation, the current location of the mobile device can be determined (Optional Step 1112). The current location and the address can be provided to the route application (Step 1114). The route application can provide route information including displaying the route superimposed on the map (Optional Step 1116). For example, the route 1004 can be superimposed on the map 800, as shown in FIG. 12. As described above, the route information can include an audio file delivered by a podcast, or to a voicemail application.

Accordingly, by a user calling a telephone directory service, the user can receive in response a map generated by the map application including a visual representation of a location corresponding to the telephone number requested from the telephone directory service and optionally a route from the current location of the mobile device (and therefore the user) to the location. An information balloon, or other such visual representation, can be provided in conjunction with the map (e.g., superimposed thereon) providing the telephone number, for example, information balloon 1202 shown in FIG. 12. The telephony application can be employed by the user to automatically call the telephone number. For example, the user can select the telephone number 1204 displayed within the information balloon 1202 to initiate a call to the number.

In another implementation, a user of the mobile device can send a short message (i.e., text message) to a telephone directory service and receive a short message in response including the requested information, e.g., a telephone number and/or address. For example, AT&T Wireless provides a service called TXT-411, wherein mobile customers of AT&T Wireless can use short messaging to communication with a telephone directory service, both to request and receive information. In this implementation, once the short message is received including the telephone number and address, steps 1104 onwards in process 1100 can be performed to provide the user a map and optionally route information. That is, step 1102 can be eliminated in this implementation and replaced by a step wherein user input is received providing a short message to send to a directory service, the short message including a request for a telephone number and/or address.

An engine, as the term is used throughout this application, can be a piece of hardware that encapsulates a function, can be firmware or can be a software application. An engine can perform one or more functions, and one piece of hardware, firmware or software can perform the functions of more than one of the engines described herein. Similarly, more than one piece of hardware, firmware and/or software can be used to perform the function of a single engine described herein.

The foregoing descriptions of specific embodiments of the present invention are presented for purposes of illustration and description. They are not intended to be exhaustive or to limit the invention to the precise forms disclosed. Rather, it should be appreciated that various modifications may be made without departing from the spirit and scope of the invention. Accordingly, other embodiments are within the scope of the following claims.

What is claimed is:

1. A method comprising:
   receiving an electronic message at a mobile device;
   displaying the electronic message in an electronic message user interface, the electronic message including sender information;
   determining a contact entry of an address book application associated with the sender information of the electronic message, the contact entry including physical address information;
   determining a geographic location of the mobile device; and
   displaying the contact entry on an address book application user interface, the displayed contact entry including proximity information indicating a distance from the device to the physical address of the contact entry.

2. The method of claim 1, wherein the mobile device includes a multi-touch-sensitive display and further comprising:
   receiving input from a user indicating a selection of the sender information, where the input comprises the user touching the sender information on the multi-touch-sensitive display.

3. The method of claim 1, further comprising:
   determining a route from the geographic location of the mobile device to the physical address of the contact entry; and
   displaying in a map user interface a graphical representation indicating a route from the geographic location of the mobile device to the physical address of the contact entry.

4. The method of claim 3, wherein the graphical representation includes a graphical display of the route superimposed on a map.

5. The method of claim 3, wherein the map user interface presents textual directions for the route.

6. The method of claim 3, wherein the mobile device presents audio directions for the route.

7. The method of claim 3, further comprising:
   providing the geographic location of the mobile device and the physical address of the contact entry to a route service with a request for a route therebetween; and
   receiving route information describing the route in response to the request.

8. The method of claim 1, further comprising:
   providing the physical address of the contact entry to a map service with a request for a map including the physical address; and
   receiving the map in response to the request.

9. A non-transitory computer-readable medium having instructions stored thereon, which, when executed by a processor, cause the processor to perform operations comprising:
   receiving an electronic message at a mobile device;
   displaying the electronic message in an electronic message user interface, the electronic message including sender information;
   determining a contact entry of an address book application associated with the sender information of the electronic message, the contact entry including physical address information;
   determining a geographic location of the mobile device; and
   displaying the contact entry on an address book application user interface, the displayed contact entry including proximity information indicating a distance from the device to the physical address of the contact entry.

10. The computer-readable medium of claim 9, wherein the mobile device includes a multi-touch-sensitive display and further comprising:
    receiving input from a user indicating a selection of the sender information, where the input comprises the user touching the sender information on the multi-touch-sensitive display.

11. The computer-readable medium of claim 9, further comprising instructions, which, when executed by a processor, cause the processor to perform operations comprising:
    determining a route from the geographic location of the mobile device to the physical address of the contact entry; and
    displaying in a map user interface a graphical representation indicating a route from the geographic location of the mobile device to the physical address of the contact entry.

12. A system comprising:
    a processor;
    a storage device coupled to the processor and configurable for storing instructions, which, when executed by the processor cause the processor to perform operations comprising:
    receiving an electronic message at a mobile device;
    displaying the electronic in an electronic message user interface, the electronic message including sender information;
    determining a contact entry of an address book application associated with the sender information of the electronic message, the contact entry having physical address information;
    determining a geographic location of the mobile device; and
    displaying the contact entry on an address book application user interface, the displayed contact entry including proximity information indicating a distance from the device to the physical address of the contact entry.

13. The method of claim 1, wherein the proximity information indicates a radial distance from the device to the physical address of the contact entry.

14. The method of claim 1, wherein the proximity information indicates a distance associated with the closest travel route from the device and the physical address of the contact entry.

* * * * *